(12) United States Patent
Hendren et al.

(10) Patent No.: US 11,845,041 B2
(45) Date of Patent: Dec. 19, 2023

(54) ELECTRICALLY CONDUCTIVE MEMBRANE ASSEMBLY AND RELATED SYSTEMS AND METHODS

(71) Applicant: Research Triangle Institute, Research Triangle Park, NC (US)

(72) Inventors: Zachary Doubrava Hendren, Durham, NC (US); Young Chul Choi, Alpharetta, GA (US); Gyu Dong Kim, Cary, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 285 days.

(21) Appl. No.: 17/286,451

(22) PCT Filed: Oct. 30, 2019

(86) PCT No.: PCT/US2019/058725
§ 371 (c)(1),
(2) Date: Apr. 17, 2021

(87) PCT Pub. No.: WO2020/092478
PCT Pub. Date: May 7, 2020

(65) Prior Publication Data
US 2022/0008869 A1 Jan. 13, 2022

Related U.S. Application Data

(60) Provisional application No. 62/753,283, filed on Oct. 31, 2018.

(51) Int. Cl.
*B01D 65/08* (2006.01)
*B01D 63/08* (2006.01)
(Continued)

(52) U.S. Cl.
CPC .......... *B01D 65/08* (2013.01); *B01D 63/082* (2013.01); *B01D 71/42* (2013.01); *B01D 71/72* (2013.01); *B01D 2321/22* (2013.01)

(58) Field of Classification Search
None
See application file for complete search history.

(56) References Cited

U.S. PATENT DOCUMENTS 5,064,515 A 11/1991 Harapanahalli
2012/0152845 A1 6/2012 Levan et al.
(Continued)

FOREIGN PATENT DOCUMENTS

EP 2341031 A1 7/2011
KR 10-1485345 B1 1/2015
(Continued)

OTHER PUBLICATIONS

PCT Written Opinion dated Mar. 9, 2020 for PCT International Application No. PCT/US2019/058725.
(Continued)

*Primary Examiner* — Krishnan S Menon
(74) *Attorney, Agent, or Firm* — Olive Law Group, PLLC; Nathan P. Letts

(57) ABSTRACT

A membrane assembly for separating a feed liquid into a permeate and a retentate includes a semipermeable membrane and conductive members for applying a voltage effective for charging a semipermeable surface of the membrane, thereby reducing or preventing fouling or scaling of the membrane. The conductive members may be positioned adjacent to the semipermeable membrane, and may be configured as feed spacers or permeate spacers. Alternatively or additionally, the membrane may be electrically conductive. Power from an external source may be supplied to one or more of the conductive members, or also the
(Continued)

membrane if conductive, which may be done wirelessly. One or more membrane assemblies may be provided in a container. One or more membrane assemblies may be provided in a stacked configuration, or wrapped around a tube in a spiral configuration.

22 Claims, 15 Drawing Sheets

(51) Int. Cl.
    *B01D 71/42*     (2006.01)
    *B01D 71/72*     (2006.01)

(56) References Cited

U.S. PATENT DOCUMENTS

| | | |
|---|---|---|
| 2013/0026088 A1 | 1/2013 | Coster et al. |
| 2013/0168249 A1 | 7/2013 | Volkel et al. |
| 2017/0222472 A1 | 8/2017 | Lee et al. |
| 2018/0161729 A1 | 6/2018 | Yaeger et al. |
| 2019/0143275 A1* | 5/2019 | Arnusch .............. C08J 7/06 210/636 |

FOREIGN PATENT DOCUMENTS

| | | | |
|---|---|---|---|
| KR | 10-2016-0030107 A | 3/2016 | |
| WO | WO-2009081942 A1 * | 7/2009 | ............. B01D 63/12 |
| WO | 2014/186694 A1 | 11/2014 | |

OTHER PUBLICATIONS

PCT International Search Report dated Mar. 9, 2020 for PCT International Application No. PCT/US2019/058725.
Karimi, Z., et al. "Modulated formation of metal-organic frameworks by oriented growth over mesoporous silica." J, Mater, Chem. A, Mar. 7, 2013, 3047-3054, 1 (9), Royal Society of Chemistry (RSC) United Kingdom.
Liu, Y., et al. "Synthesis of continuous MOF-5 membranes on porous a-alumina substrates." Microporous and Mesoporous Materials, Feb. 2009, pp. 296-301, 118 (1-3), Elsevier, Amsterdam.
Furtado, M., et al. "Mesoporous silica-metal organic composite: synthesis, characterization, and ammonia adsorption." J. Mater. Chem., Mar. 30, 2011, 6698-6706, 21 (18), RSC, United Kingdom.
Yan, Xinlong, et al. "Facile synthesis of mesoporous MOF/silica composites." RSC Adv., 2014, 5 pages, 4 (101), RSC, United Kingdom.
Sorribas, S., et al. "Synthesis and gas adsorption properties of mesoporous silica-NH2-MIL-53(Al) core-shell spheres." Microporous and Mesoporous Materials, May 1, 2016, 116-121, 225, Elsevier, Amsterdam.
Office Action for associated Saudi Arabia patent application No. 519400983 dated Jan. 25, 2022 with translation.
International Preliminary Report on Patentability for corresponding PCT International Application No. PCT/US2019/058725. (8 pages).

* cited by examiner

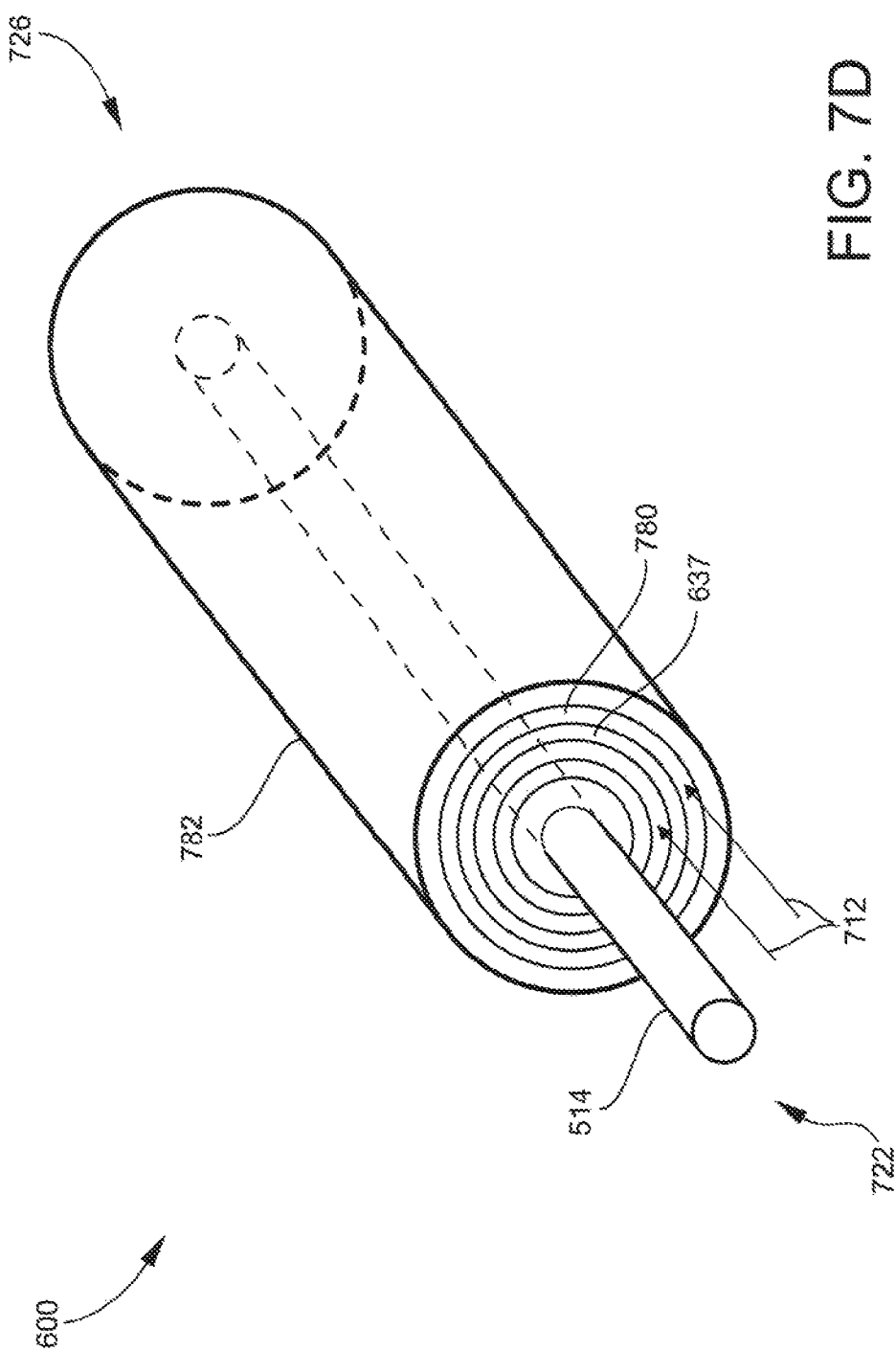

ELECTRICALLY CONDUCTIVE MEMBRANE ASSEMBLY AND RELATED SYSTEMS AND METHODS

CROSS REFERENCE TO RELATED APPLICATIONS

This application is related to and claims priority to PCT International Patent Application No. PCT/US2019/058725, dated Oct. 30, 2019, entitled "ELECTRICALLY CONDUCTIVE MEMBRANE ASSEMBLY AND RELATED SYSTEMS AND METHODS," which claims priority to U.S. Provisional Patent Application No. 62/753,283, filed on Oct. 31, 2018, entitled "ELECTRICALLY CONDUCTIVE MEMBRANE ASSEMBLY AND RELATED SYSTEMS AND METHODS," the entire contents of which are incorporated herein by reference.

TECHNICAL FIELD

The present invention relates to membrane-based filtering of liquids, and particularly to membrane-based filtering in which electrical energy is utilized to impede the scaling or fouling of membrane surfaces.

BACKGROUND

Membrane-based filtration involves the use of membrane filtration units containing membrane filter elements. Membrane-based filtration is widely utilized for the selective removal of a wide range of contaminants from impaired water sources, including industrial and municipal wastewaters as well as seawater and brackish and briny waters. A key challenge during the treatment of these waters is the fouling or scaling of the membrane filter elements, which reduces overall performance and requires greater energy input to maintain water throughput for each membrane filter element. Current approaches to mitigate fouling and scaling depend on the type of blockage, but typically are some form of chemical clean-in-place (CIP). The CIP process requires periodically shutting down the treatment plant in which the membrane filtration units operate. In addition, the membrane filtration units eventually must be replaced after becoming irreversibly impaired, i.e., when the CIP process is no longer effective to recondition the fouled membrane filtration units. Thus, the CIP process adds a significant financial cost to the water treatment operation and reduces a treatment plant's overall productivity.

It has been demonstrated that the application of electrically charged surfaces reduces the rate of biological fouling and scale formation (and thus membrane blockage) on the surface of a filtration membrane. See de Lannoy et al., Aquatic Biofouling Prevention by Electrically Charged Nanocomposite Polymer Thin Film Membranes, *Environ. Sci. Technol.* (2013). This concept has been shown to successfully prevent or inhibit biological growth and fouling on electrically conductive membranes, albeit thus far only in a lab-scale environment utilizing flat-sheet membranes having surface areas less than 0.1 m². This reduced blockage may directly translate into prolonged performance by increasing operating time before chemical cleaning or membrane replacement is required. Fouling reduction is possible via a number of mechanistic pathways, including electrostatic repulsion, oxidation/reduction of microbial cells, pH changes, and electrochemical generation of hydrogen peroxide.

However, the lab-scale modules utilized to date to demonstrate the benefits of an electrically charged membrane cannot be directly transferred to a commercial-scale module. The electrical power supply to the system is delivered using wired connections drilled into the membrane pressure cells. This type of approach to power delivery would not be practical upon scale-up to large-scale membrane systems. The likelihood of failure at wired entrance ports would make the prospect of applying power too risky for practical, commercial implementation. Moreover, the combination of a larger membrane area and reduced gap between the membrane surface and counter-electrode would result in uneven voltage distribution and high power consumption. Further, given the established infrastructure of large-scale reverse osmosis (RO) and nanofiltration (NF) plants, any technological replacements for high-pressure membrane systems would need to be implemented via a "drop in replacement" fashion to gain commercial acceptance.

Thus, despite published research on the proposed use of electrically conductive membranes (or spacers adjacent to the membranes) to prevent biofouling, thus far the concept of using charged surfaces to prevent fouling has not been shown to be commercially feasible or practical using the known approaches. Consequently, there currently are no existing full-scale RO or NF membrane systems that employ electrical charge within the membrane assembly.

The closest existing approach may be electro-dialysis reversal (EDR), which is a salt removal membrane process that uses charged electrodes for salt removal. However, there are key differences between EDR and the use of electrically conductive filtration membranes. In EDR, the salt removal mechanism is the charged electrodes themselves, as opposed to the semipermeable membranes used in RO and NF. In EDR, the purpose of the electrical charges in EDR is to serve as the salt removal mechanism, as opposed to enhancing RO or NF performance by mitigating fouling of the filtration membrane. In addition, EDR operates at low pressure (less than 30 pounds per square inch (psi)) and the power needed for operation is wired directly to the membrane stacks. Such an approach would not work under the high pressures (e.g., greater than 800 psi) needed for RO or NF.

In view of the foregoing, there is an ongoing need for new devices, systems, and methods for reducing or preventing the formation of foulants on the surfaces of membranes utilized for filtering liquids.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a membrane assembly for separating a feed liquid into a permeate and a retentate includes: a first side for receiving the feed liquid; a second side for outputting the permeate; a membrane body comprising a semipermeable front surface at the first side, a back surface at the second side, and a thickness defined from the semipermeable front surface to the back surface, wherein the membrane body is configured to pass the permeate through the semipermeable front surface to the back surface, and prevent the retentate from passing through the semipermeable front surface; a porous first electrically conductive member positioned at the first side and configured to pass the feed liquid through the porous first electrically conductive member to the semipermeable front surface; and a porous second electrically conductive member positioned at the second side and configured to pass the permeate from the back surface through the porous second electrically conductive member, wherein the porous first electrically conductive member and the porous second electrically conductive member are configured to maintain the semipermeable front surface in an electrically charged state when a voltage is applied between the porous first electrically conductive member and the porous second electrically conductive member.

According to another embodiment, the membrane assembly includes a power receiving unit communicating with at least one of the porous first electrically conductive member or the porous second electrically conductive member, and configured to receive electrical power from a power source external to the membrane assembly.

According to another embodiment, the power receiving unit is a wireless power receiving unit.

According to another embodiment, a liquid filtration system includes: a membrane assembly according to any of the embodiments disclosed herein; and a power supply system comprising: a power transmitting unit configured to receive power from an electrical power source; and a power receiving unit communicating with the power transmitting unit and with at least one of the porous first electrically conductive member or the porous second electrically conductive member.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 7D is a schematic perspective, partially cut-away view of the membrane assembly illustrated in FIG. 6 in an assembled state, from the perspective of a first end of the membrane assembly.

DETAILED DESCRIPTION

Figure 1:
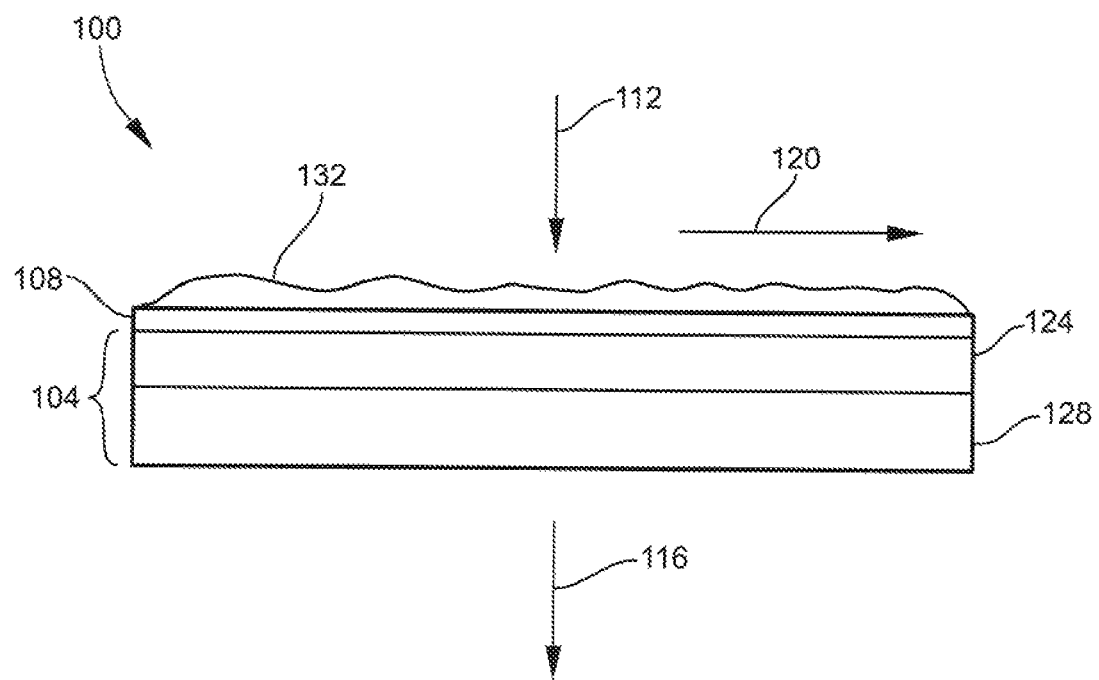
FIG. 1 is a schematic cross-sectional view of an example of a conventional membrane assembly.

FIG. 1 is a schematic cross-sectional view of an example of a conventional membrane assembly 100. The membrane assembly 100 has a two-dimensional (2D), or planar, geometry, i.e. in the form of a sheet. The membrane assembly 100 includes a support structure 104 and a semipermeable layer 108 disposed on the support structure 104. The semipermeable layer 108 is composed of a material (or a composite of two or more materials) configured to allow selected components of a feed liquid 112 supplied to the front side (top side from the perspective of FIG. 1) of the semipermeable layer 108 to pass through the semipermeable layer 108, while preventing other components of the feed liquid 112 from entering the semipermeable layer 108. The components of the feed liquid 112 passing through the semipermeable layer 108 (and support structure 104) may be referred to as a permeate (or filtrate) 116, and the components of the feed liquid 112 prevented from passing through the semipermeable layer 108 may be referred to as a retentate (or concentrate) 120. For this purpose, the semipermeable layer 108 is typically a porous thin-film polymer such as polyamide. The support structure 104 may include one or more layers 124 and 128 of porous materials configured to allow the permeate 116 to flow through the support structure 104. For example, the layers 124 and 128 may be composed of a microporous polymer and a non-woven polymer fabric, respectively.

The permeate 116 and the retentate 120 thus exit the membrane assembly 100 as separate flow streams. The permeate 116 may be collected for later use. For example, the membrane assembly 100 may be part of a water purification unit utilized to purify (remove contaminants from and/or desalinize) water, in which case the permeate 116 is purified water.

Conventionally, over time and with continued use, the membrane assembly 100 becomes fouled. Specifically, a foulant 132 (e.g., a biofilm, scaling, and/or other contaminant) develops on the front side of the semipermeable layer 108. Consequently, the membrane assembly 100 must be periodically cleaned to remove the foulant 132, such as by applying external chemicals, or the membrane assembly 100 may need to be replaced.

Embodiments of the present disclosure, as exemplified by FIGS. 2 to 10 and described below, address the problem of fouling in membrane-based filtration devices and systems.

Figure 2:
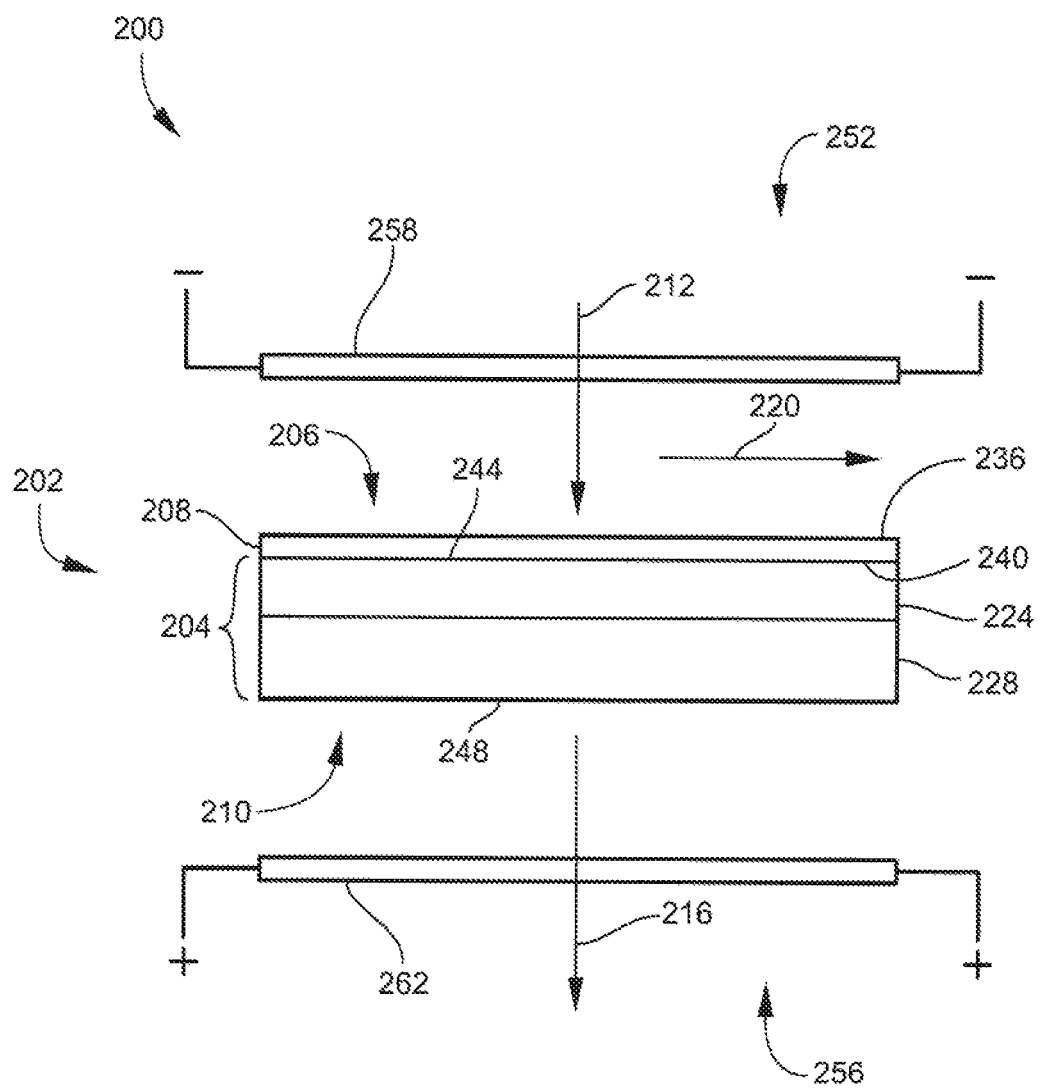
FIG. 2 is a schematic cross-sectional view of an example of a membrane assembly according to an embodiment of the present disclosure.

FIG. 2 is a schematic cross-sectional view of an example of a membrane assembly 200 according to an embodiment of the present disclosure. The membrane assembly 200 includes a membrane body 202. The membrane body 202 has a front (or input, or semipermeable) side 206, an opposing back (or output, or permeate) side 210, and a thickness between the front side 206 and the back side 210. The membrane body 202 typically has a 2D, or planar, geometry. That is, the size of the membrane body 202 is typically predominantly defined by the dimensions (e.g., length, width, etc.) of the front side 206 and the back side 210, as compared to the relatively smaller thickness of the membrane body 202. From the perspective of FIG. 1, the dimensions of the front side 206 and the back side 210 are defined along a horizontal axis and an axis perpendicular to the drawing sheet, and the thickness is defined along a vertical axis, with the understanding that this orientation is not intended to be exclusive. In the case of a 2D or planar geometry, the membrane body 202 may be characterized as being shaped as a sheet or plate. The membrane body 202 may be provided in a flat configuration as suggested in the schematic view of FIG. 2, or in a curved configuration such as a spiral configuration as described below.

The membrane body 202 includes a support structure 204 and a semipermeable layer 208 disposed on the support structure 204. The semipermeable layer 208 has a front (or input, or semipermeable) surface 236 at (or corresponding to) the front side 206 of the membrane body 202, an opposing back (or output, or permeate) surface 240, and a thickness between the front surface 236 and the back surface 240. The support structure 204 has a front surface 244 disposed at (and facing) the back surface 240 of the semipermeable layer 208, an opposing back surface 248 at (or corresponding to) the back side 210 of the membrane body 202, and a thickness between the front surface 244 and the back surface 248. The semipermeable layer 208 and the support structure 204 have the above-described 2D or planar geometry, and define the overall geometry and dimensions of the membrane body 202.

The membrane assembly 200 may be sized to accommodate its use in a commercial-scale liquid filtration system. As one non-exclusive example, the planar surface area of the membrane body 202 (such as the surface area of the front surface 236 of the semipermeable layer 208), may be in a range from 0.1 square meters ($m^2$) to 100 $m^2$. In other non-exclusive examples, the planar surface area of the membrane body 202 may be in a range from 1 $m^2$ to 100 $m^2$, or 8 $m^2$ to 50 $m^2$. For smaller-scale applications such as for household units, a surface area of about 1 $m^2$ may be preferred.

The semipermeable layer 208 is composed of a material (or a composite of two or more materials) configured to allow selected components (permeate 216) of a feed liquid 212 supplied to the front surface 236 of the semipermeable layer 208 to pass through the semipermeable layer 208 to the back surface 240, while preventing other components (retentate 220) of the feed liquid 212 from entering the semipermeable layer 208. For this purpose, the semipermeable layer 208 may be a porous or nonporous thin-film polymer (e.g., polyamide), and may operate on the principle of size exclusion and/or particle capture (e.g., sorption). Examples of polymers suitable for the semipermeable layer 208 include, but are not limited to, polyamide, polysulfone, polyvinylidenefluoride, polyacrylonitrile, and others with similar semipermeable properties suitable for liquid filtration applications. The support structure 204 may include one or more layers 224 and 228 of porous materials configured to allow the permeate 216 to flow through the support structure 204. For example, the layers 224 and 228 may be composed of a microporous polymer (e.g., polysulfone) and a non-woven polymer fabric (e.g., polyester fiber fabric), respectively. Various polymer compositions may be suitable for use as the support structure 204, as appreciated by persons skilled in the art.

Generally, the composition and porosity of the material of one or more components of the membrane assembly 200 (e.g., the semipermeable layer 208, the support structure 204, etc.), as well as other parameters such as operating pressure, may be selected as desired for a particular application. For example, the membrane assembly may be configured for microfiltration (MF), ultrafiltration (UF), nanofiltration (NF), or reverse osmosis (RO). Accordingly, in the broad aspects of the present disclosure, no specific limitation is placed on the operating pressure of the membrane assemblies or the associated liquid filtrations systems in which membrane assemblies operate. As one non-exclusive example, the operating pressure may be in a range from atmospheric pressure (about 14 pounds per square inch absolute (psia) to 2500 psia.

FIG. 2 depicts the flows of the feed liquid 212, the permeate 216, and the retentate 220 in a highly schematic manner. Any given liquid flow may be in more than one direction, such as in the plane perpendicular to the drawing sheet. The direction(s) of liquid flow may depend, for example, on pressure differentials established in the liquid filtration system in which the membrane assembly 200 is provided, the container in which the membrane assembly 200 is disposed, the presence of baffles or other flow-directing structures, etc.

Generally, the membrane assembly 200 has a first side 252 and an opposing second side 256, with the membrane body 202 (semipermeable layer 208 and support structure 204) positioned between the first side 252 and the second side 256. The semipermeable layer 208 faces the first side 252, and the support structure 204 faces the second side 256. The feed liquid 212 is supplied to the membrane assembly 200 at the first side 252 and thus is supplied to the front side 206 of the membrane body 202. The retentate 220 exits the membrane assembly 200 from the first side 252. The permeate 216 exits the membrane assembly 200 from the second side 256.

According to an embodiment and as further shown in FIG. 2, the membrane assembly 200 further includes a first electrically conductive member or first electrode 258 and a second electrically conductive member or second electrode 262. The first electrode 258 is positioned on the first side 252 of the membrane assembly 200. Depending on the embodiment, the first electrode 258 may be spaced from the membrane body 202 (as schematically illustrated) or directly adjacent to the membrane body 202 (e.g., contacting the semipermeable layer 208). The second electrode 262 is positioned on the second side 256 of the membrane assembly 200. Depending on the embodiment, the second electrode 262 may be spaced from the membrane body 202 (as schematically illustrated) or directly adjacent to the membrane body 202 (e.g., contacting the support structure 204).

The first electrode 258 and the second electrode 262 may have a 2D or planar geometry like the semipermeable layer 208 and the support structure 204. The planar areas of the first electrode 258 and the second electrode 262 may be a significant percentage (e.g. 70% to 100%) of the planar areas of the semipermeable layer 208 and the support structure 204.

The first electrode 258 and the second electrode 262 may have a suitable porous configuration. In the present context, a "porous" configuration is a structure or geometry that allows fluid to pass through the thickness of the first electrode 258 or second electrode 262, such as depicted by arrows in FIG. 2 representing the flows of the feed liquid 212 and the permeate 216. Thus, the porous configuration may be characterized by openings, passages, holes, pores, or the like that provide fluid paths through the thickness of the first electrode 258 or second electrode 262. For example, the porous configuration may be a grid, mesh, or woven structure (e.g., a fabric, cloth, etc.).

Generally, the first electrode 258 and the second electrode 262 may be composed of any suitable electrically conductive material that may be fabricated or formed to have a porous configuration. Examples of the composition of the first electrode 258 and the second electrode 262 include, but are not limited to, a metal (e.g., titanium, copper, aluminum, etc.), a metal alloy such as an alloy containing one of the foregoing specified metals, carbon, or an electrically conductive organic polymer. The conductive polymer may be an intrinsically conductive polymer, or a polymer that has been doped or grafted with a metal as appreciated by persons skilled in the art. Examples of intrinsically conductive polymers include, but are not limited to, poly(3,4-ethylenedioxythiophene) polystyrene sulfonate (PEDOT:PSS), polyacetylene, polypyrrole (PPY), polyindole, and polyaniline (PANI). As further examples, the first electrode 258 and/or the second electrode 262 may be constructed of woven titanium, carbon cloth, etc.

In an embodiment, the membrane assembly 200 may include a plurality of membrane bodies 202, such as illustrated in FIG. 2, disposed in a stacked arrangement. In an embodiment, the stacked arrangement may be a spiral wound configuration as described below. In an embodiment, a planar electrically conductive member having a porous configuration, such as the first electrode 258 and/or the second electrode 262, may be utilized as a planar spacer member (spacer) between two adjacent planar structures, such as between two adjacent membrane bodies 202, to provide a volumetric space for liquid to flow between the two adjacent planar structures. For example, the first electrode 258 may be utilized as a feed spacer that accommodates the flow of feed liquid 212 (particularly to the front side 206 of the membrane body 202), and the second electrode 262 may be utilized as a permeate spacer that accommodates the flow of permeate 216 (particularly from the back side 210 of the membrane body 202).

The first electrode 258 and the second electrode 262 are configured to apply a voltage between the first electrode 258 and the second electrode 262 and thus across the thickness of the membrane body 202. For this purpose, the first electrode 258 and/or the second electrode 262 are configured to be coupled to an electrical power supply system containing an electrical power source (e.g., a voltage source) such that, when the power supply system is actively supplying electrical power to the first electrode 258 and/or the second electrode 262, a voltage is applied to the membrane body 202. The first electrode 258 and/or the second electrode 262 may be coupled to the power supply system via wired electrical communication links, wireless electrical communication links, or a combination of wired and wireless electrical communication links. In an embodiment, one of the electrodes 258 or 262 is coupled so as to directly receive power from the power source, while the other electrode 258 or 262 serves as a counter-electrode and, for example, may be grounded (e.g., may be connected to an electrical ground, such as a grounded portion of circuitry of the power supply system).

The voltage applied to the membrane body 202 results in an electrically charged surface (e.g., the first electrode 258 and/or the second electrode 262) at or near (the front surface 236 of) the semipermeable layer 208. The presence of the electrically charged surface has the effect of preventing, or at least significantly delaying (and/or reducing the amount of), the fouling of the membrane assembly 200 that normally occurs over its service life (i.e., would otherwise occur without the electrical charging disclosed herein), thereby improving the performance of the membrane assembly 200 as a liquid filtration device. In particular, the electrically charged surface may prevent, or at least significantly delay and/or reduce, the development of a foulant layer or film (e.g., the foulant 132 noted above and illustrated in FIG. 1) on the semipermeable layer 208. The planar configuration of the first electrode 258 and the second electrode 262 may facilitate distributing electrical charge uniformly (or evenly) over a planar area that spans a substantial portion of the area of the semipermeable layer 208 at which fouling is likely to occur. The voltage may be applied as needed or desired while the membrane assembly 200 is being utilized for liquid separation. The voltage may be applied continuously or periodically (or intermittently) as needed or desired.

In an embodiment, the semipermeable layer 208 may be configured as, or include, an electrically conductive component. For example, the semipermeable layer 208 may include an electrically conductive material disposed on its front surface 236 and/or embedded in (or dispersed through) the semipermeable layer 208. In an embodiment, the semipermeable layer 208 comprises a polymer such as polyamide to which carbon nanotubes (CNTs) are attached to render the semipermeable layer 208 electrically conductive. In such embodiment, application of the voltage charges the (electrically conductive part of the) semipermeable layer 208. The (electrically conductive part of the) semipermeable layer 208 may be coupled to the power supply system via wired electrical communication links or to electrical ground in a manner similar to the first electrode 258 and the second electrode 262. Accordingly, the voltage may be applied between the first electrode 258 and the second electrode 262 as described above, and/or between the first electrode 258 and the semipermeable layer 208, and/or between the second electrode 262 and the semipermeable layer 208. In this embodiment, the semipermeable layer 208 generally may include an electrically conductive component of any configuration (e.g., composition, structure, etc.) effective for rendering at least a portion of the semipermeable layer 208 (e.g., the semipermeable front surface 236) electrically conductive without appreciably impairing the semipermeable property of the semipermeable layer 208. In addition to CNTs, other examples of an electrically conductive component include, but are not limited to, conductive polymers (intrinsically conductive polymers or doped/grafted polymers) such as specified above.

In an embodiment, the first electrode 258 and the second electrode 262 each may include a main electrode structure (e.g., a planar, porous structure), and additionally one or more power distribution electrodes (e.g., electrically conductive strips) in contact with the main electrode structure. The power distribution electrode(s) may serve to couple the main electrode structure to the power source or electrical ground. In addition, the power distribution electrode(s) may be configured (e.g., arranged in a pattern) to facilitate the uniform distribution of electrical charge over the area of the first electrode 258 or second electrode 262. This may be desired, for example, in an embodiment where the conductivity of the material of the main electrode structure is not high enough to ensure uniform distribution of electrical charge.

In an embodiment, the various electrically conductive components of the membrane assembly 200 that are subject to the corrosive effects of the liquid to be filtered (e.g., water, particularly briny water) may be coated with a protective coating of appropriate composition (e.g., various polymers), as appreciated by persons skilled in the art. Such protective coating may be electrically insulating or a dielectric.

Figure 3A:
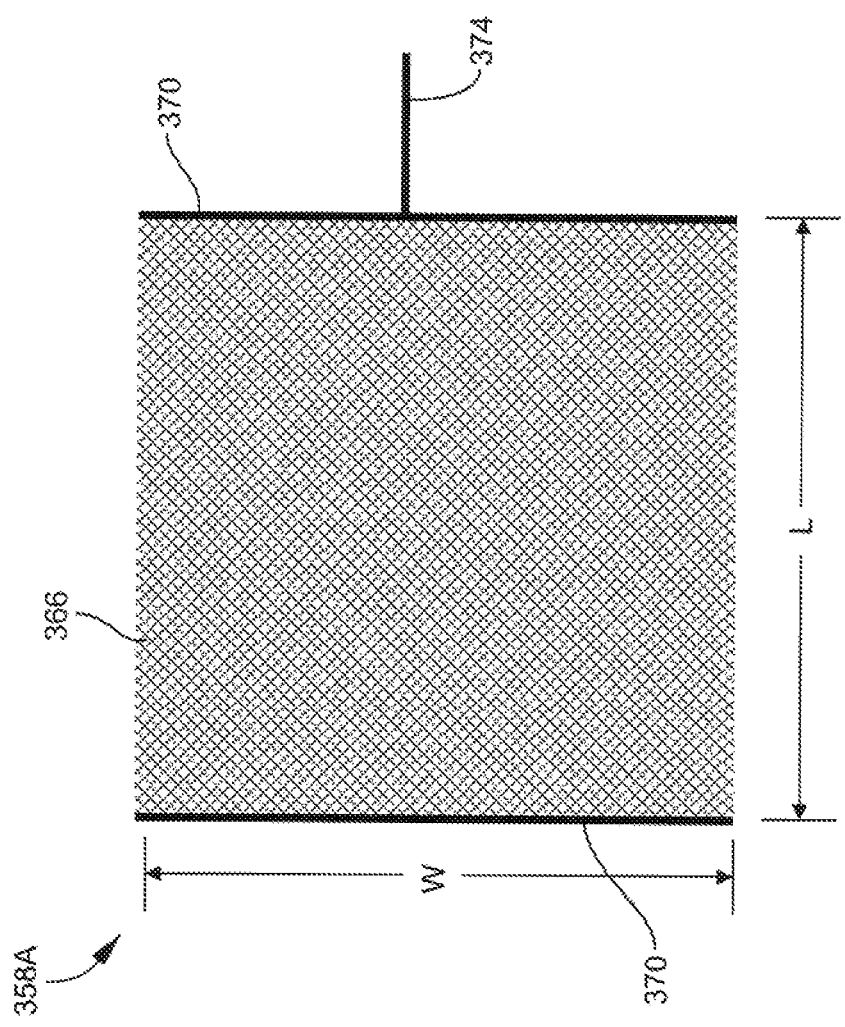
FIG. 3A is a schematic plan view of an example of an electrically conductive member having a planar (2D), porous configuration according to an embodiment.

FIG. 3A is a schematic plan view of an example of an electrically conductive member 358A having a planar (2D), porous configuration according to an embodiment. The electrically conductive member 358A may correspond to the first electrode 258 and/or the second electrode 262 described above and illustrated in FIG. 2, and may serve as a feed spacer or a permeate spacer as described herein. The electrically conductive member 358A includes a main electrode structure 366 having a planar, porous configuration as described above. The main electrode structure 366 may have a rectilinear shape defined by a length L and a width W. As one non-exclusive example, the length L and width W may be 1 meter or about 1 meter, but more generally may be less or more than 1 meter. Moreover, the square shape shown in FIG. 3A is merely illustrative and not limiting.

The electrically conductive member 358A further includes one or more power distribution electrodes 370 electrically connected to the main electrode structure 366 by any suitable means (e.g., welding, solder, electrically conductive bonding agent, etc.). The power distribution electrodes 370 may be shaped as conductive strips (e.g., plates having a narrow and/or elongated dimension), wires, etc. The power distribution electrodes 370 may be composed of a highly electrically conductive material such as, for example, (e.g., titanium, copper, electrically conductive organic polymer, etc.). The electrical conductivity of the power distribution electrodes 370 may be about the same as or higher than the electrical conductivity of the main electrode structure 366. At least one of the power distribution electrodes 370 is connected to an electrical line or lead 374 (e.g., a conductive strip, wire, etc.), which in turn is to be connected to a power supply system such as described herein. In the present embodiment, the power distribution electrodes 370 are positioned at respective edges of the electrically conductive member 358A, and may be in contact with one or both planar sides of the main electrode structure 366. While FIG. 3A shows two power distribution electrodes 370 positioned at the two edges running along the width W of the main electrode structure 366, power distribution electrodes 370 may additionally or alternatively be positioned at one or both of the edges running along the length L of the main electrode structure 366.

Figure 3B:
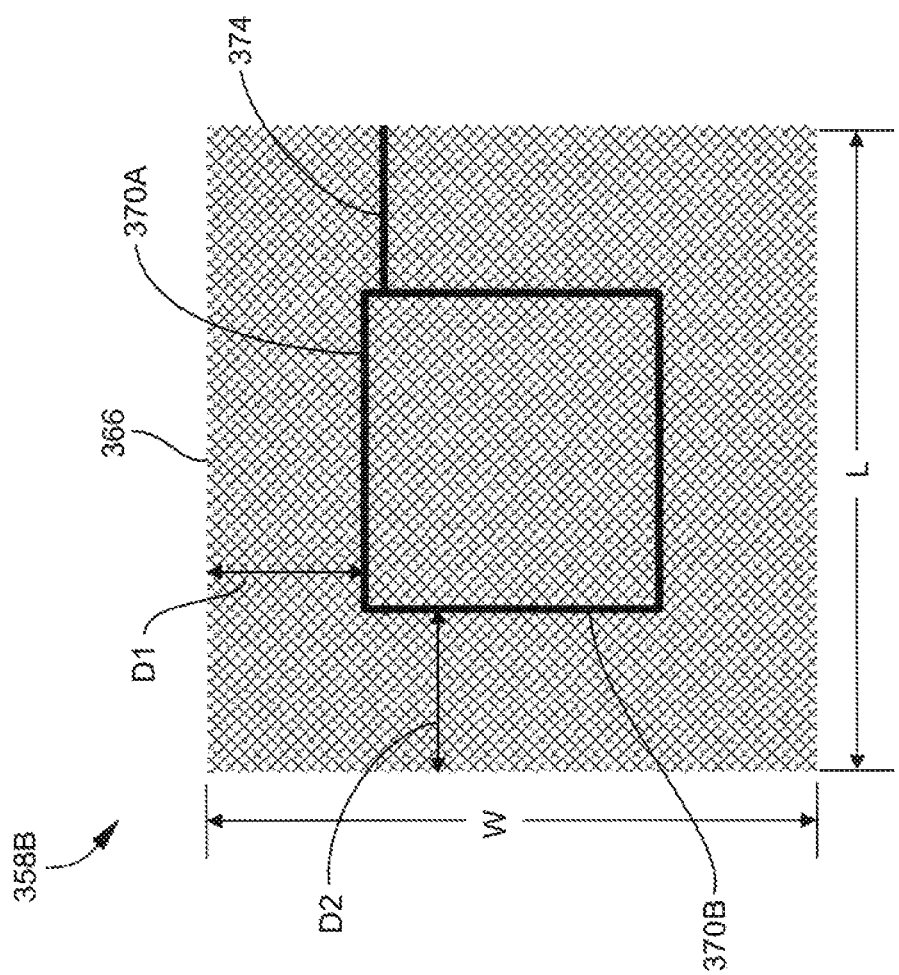
FIG. 3B is a schematic plan view of an example of an electrically conductive member according to another embodiment.

FIG. 3B is a schematic plan view of an example of an electrically conductive member 358B according to another embodiment. The electrically conductive member 358B may correspond to the first electrode 258 and/or the second electrode 262 described above and illustrated in FIG. 2, and may serve as a feed spacer or a permeate spacer as described herein. The electrically conductive member 358B includes the planar, porous main electrode structure 366 as described above, and one or more power distribution electrodes 370A and 370B positioned on at least one planar side of the main electrode structure 366.

In this embodiment, the power distribution electrodes 370A and 370B are positioned within the planar area of the main electrode structure 366, i.e., at distances from the edges of the main electrode structure 366. In the illustrated example, a power distribution electrode 370A is positioned parallel to, and at a distance D1 from, the edge of the main electrode structure 366 closest to that power distribution electrode 370A. Another power distribution electrode 370B is positioned parallel to, and at a distance D2 from, the edge of the main electrode structure 366 closest to that power distribution electrode 370B. A combination of power distribution electrodes 370A and 370B may be included to form a pattern on the main electrode structure 366. The pattern of power distribution electrodes 370A and 370B may be configured to ensure uniform distribution of electrical charge over the surface area of the main electrode structure 366 when power is supplied to the power distribution electrodes 370A and 370B. Any pattern may be provided that is suitable for this purpose. The illustrated square pattern, with sides parallel to the edges of the main electrode structure 366, is but one example. Providing a pattern of power distribution electrodes 370A and 370B positioned within the planar area of the main electrode structure 366 may be useful in embodiments where the electrical conductivity of the main electrode structure 366 is lower (or significantly lower) than the electrical conductivity of the power distribution electrodes 370, thereby ensuring adequate distribution of electrical charge over the surface area of the main electrode structure 366.

In the embodiment of FIG. 3B, one or more electrical lines or leads 374 may be included to connect the pattern of power distribution electrodes 370A and 370B to a power supply system such as described herein. As illustrated, the electrical lead(s) 374 may extend over a portion of the main electrode structure 366 as needed for connecting to one or more of the power distribution electrodes 370A and 370B.

In embodiments where the semipermeable layer 208 (FIG. 2) is or includes an electrically conductive component, the semipermeable layer 208 may include one or more power distribution electrodes, and/or may be connected to the power supply system via electrical lines or leads, in a manner similar to that described above and illustrated in FIGS. 3A and 3B in regard to the electrically conductive members 358A and 358B.

Figure 4:
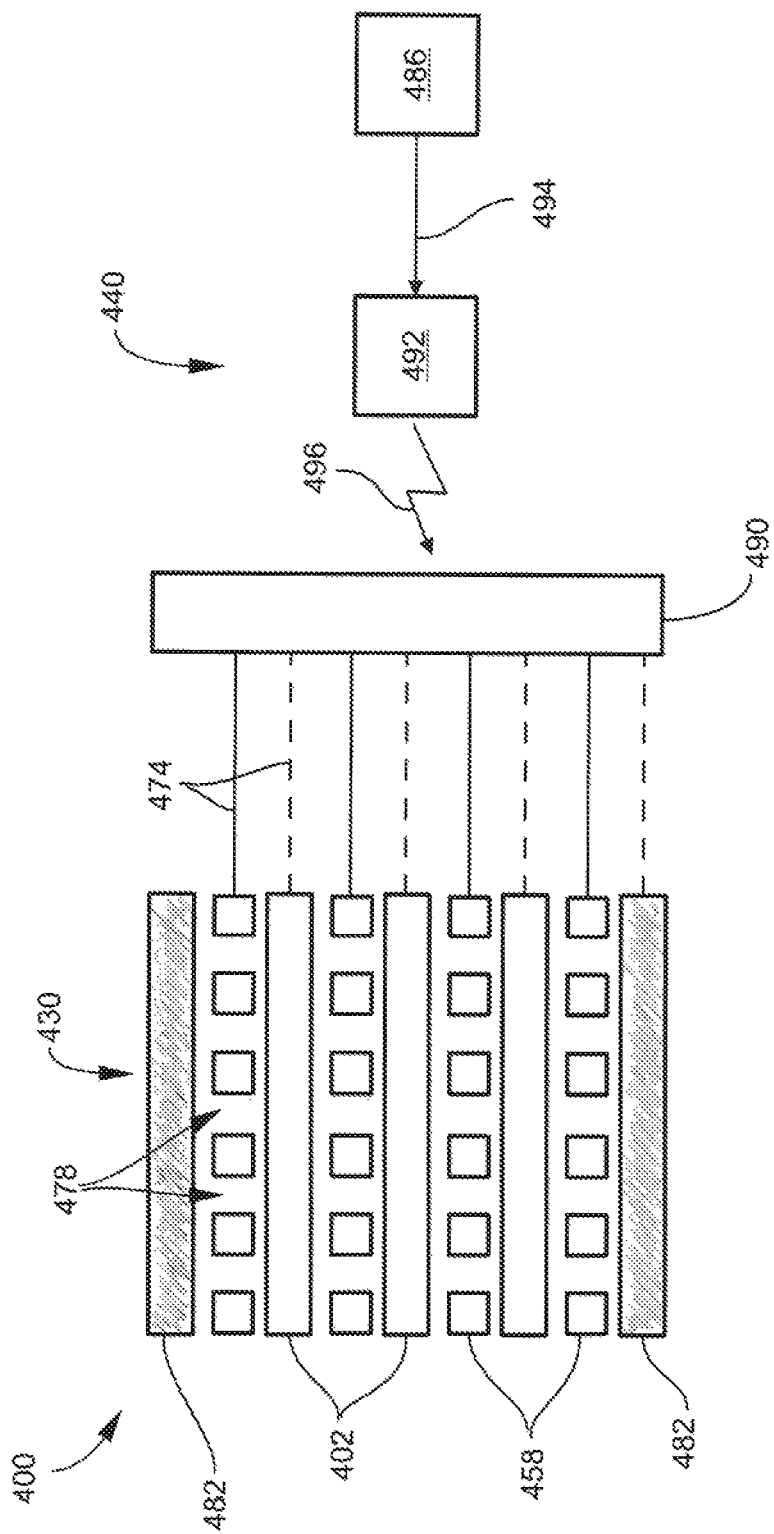
FIG. 4 is a schematic view of an example of a membrane-based liquid filtration system according to an embodiment.

FIG. 4 is a schematic view of an example of a membrane-based liquid filtration system 400 according to an embodiment. The liquid filtration system 400 includes one or more membrane assemblies 430 and a power supply system 440.

The membrane assembly 430 (or each membrane assembly 430) includes a plurality of membrane bodies 402 and electrically conductive members 458 arranged in a stacked configuration. In some embodiments, the stacked configuration may be a spiral wound configuration, as described further below. The membrane bodies 402 and conductive members 458 may be configured as described above and illustrated in FIGS. 2-3B. Accordingly, the conductive members 458 may serve as spacers between adjacent membrane bodies 402, with some conductive members 458 serving as feed spacers and other conductive members 458 serving as permeate spacers, such as may depend on their positions relative to the adjacent membrane bodies 402. Moreover, some conductive members 458 may serve as first electrodes while others serve as second electrodes in the manner described above. For simplicity, three membrane bodies 402 and four conductive members 458 are shown, with the understanding that less or more membrane bodies 402 and conductive members 458 may be included in a given embodiment of the membrane assembly 430. Each conductive member 458 includes a plurality of pores 478 (openings, holes, passages, etc.) defining flow paths through its thickness.

The membrane assembly 430 may further include one or more outer structures or layers 482 as needed to provide an enclosure for the membrane bodies 402 and conductive members 458 and a containment for the flow of liquid through the membrane assembly 430. In a spiral wound configuration, the outer structure 482 may be a cylindrical structure. In one example, the outer structure 482 may represent the cross-section of a container such as a pressure vessel.

The membrane assembly 430 may electrically communicate with the power supply system 440 via suitable wired or wireless links, such as electrical lines or leads 474 (strips, wires, etc.). Thus, at least some of the electrically conductive members 458 may be connected to the power supply system 440 via electrical lines 474, as depicted by solid lines. In an embodiment where the semipermeable layers of the membrane bodies 402 are electrically conductive, at least some of the semipermeable layers may be connected to the power supply system 440 via electrical lines 474, as depicted by dashed lines.

The power supply system 440 includes a suitable electrical power source 486, e.g., a voltage source and associated circuitry configured to receive power provided by a power distribution network such as a preexisting power grid/infrastructure. In an embodiment, electrical power is supplied by the power supply system 440 to the membrane assembly 430 via one or more power receiving units 490. Depending on the embodiment, the power receiving unit(s) 490 may be considered as being part of the membrane assembly 430 or the power supply system 440. In the illustrated embodiment, electrically conductive members 458 (or both electrically conductive members 458 and electrically conductive membrane bodies 402) communicate with a common power receiving unit 490 via the electrical lines 474. Generally, the power receiving unit(s) 490 may include any type of circuitry configured to receive power and distribute power to the membrane assembly 430. Such circuitry may also be configured to implement various other functions that may be needed once the power has been delivered inside a container (e.g., pressure vessel) in which the membrane assembly 430 and power receiving unit(s) 490 reside, from a power source 486 external to the container. Such other functions may include, for example, power conversion (e.g., DC power to AC power, or AC power to DC power), power (voltage and/or current) regulation (e.g., amplification, de-amplification, etc.), signal conditioning, etc., as appreciated by persons skilled in the art.

In an embodiment, the power supply system 440 supplies power wirelessly to the membrane assembly 430. In such embodiment, the power supply system 440 may further include one or more power transmitting units 492 communicating with the power source 486 via one or more electrical lines 494. The power receiving unit 490 is configured as a wireless receiver and the power transmitting unit 492 is configured as a wireless transmitter. Accordingly, the power transmitting unit 492 transmits power to the power receiving unit 490 via a wireless communication link 496 (e.g., an electromagnetic energy signal, such as may propagate at a radio frequency, or RF).

In wireless embodiments, the power receiving unit 490 and the power transmitting unit 492 may have any configurations suitable for receiving or sending wireless signals, as appreciated by persons skilled in the art, such as for example in the field of RF antennas. As a non-exclusive example, the power receiving unit 490 and the power transmitting unit 492 may include electrically conductive strips arranged on a supporting substrate in a pattern and geometry suitable for receiving or sending wireless signals. The power receiving unit 490 and the power transmitting unit 492 should also be configured to meet the power requirements for applying voltage to the membrane assembly 430. As a non-exclusive example, the voltage applied between any pair of electrically conductive components of the membrane assembly 430 to maintain electrical charge on a desired surface is in a range from 0.5 V to 10.0 V, which may correspond to the magnitude of a DC voltage or the peak amplitude of an AC voltage. In one more specific yet non-exclusive example, the voltage applied is about 1.5 V. In an embodiment, the geometry of the power receiving unit 490 is thin enough to allow the membrane assembly 430 to fit in a pressurized vessel.

Figure 5:
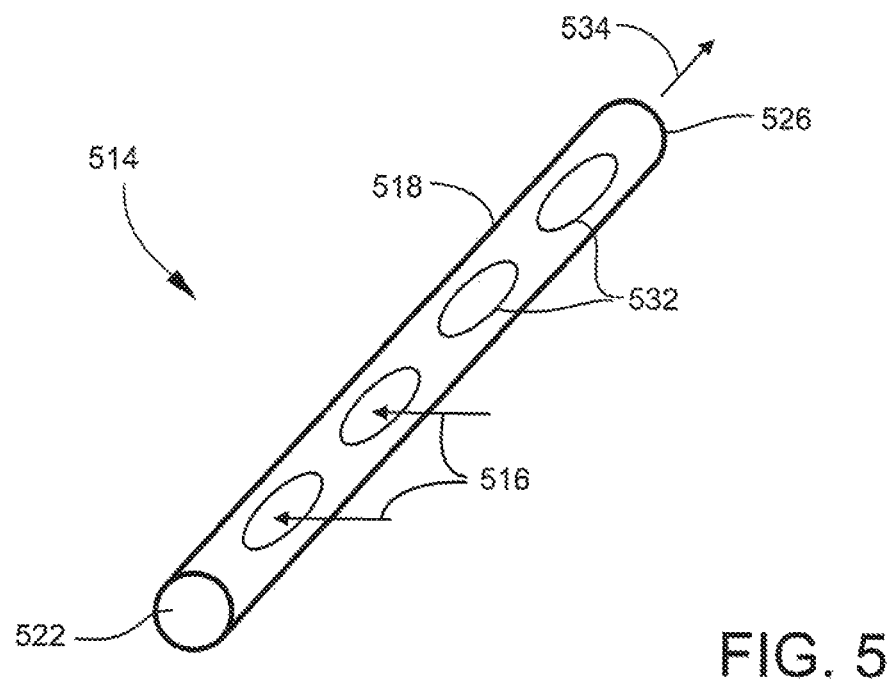
FIG. 5 is a schematic perspective view of an example of a liquid flow tube that may be utilized in a membrane assembly according to an embodiment, particularly a membrane assembly having a spiral wound configuration.

FIG. 5 is a schematic perspective view of an example of a liquid flow tube 514 that may be utilized in a membrane assembly according to an embodiment, particularly a membrane assembly having a spiral wound configuration. The liquid flow tube 514 may include a hollow (typically cylindrical) body 518 elongated between a first end 522 and a second end 526. The body 518 may include a plurality of side ports or openings 532 arranged in one or more series or rows along the longitudinal length of the body 518 (only one series or row of side ports 532 being shown in FIG. 5). In an embodiment, the first end 522 is closed, the side ports 532 serve as liquid inlets, and the second end 526 is open and serves as a liquid outlet. In such embodiment, the liquid flow tube 514 defines liquid side flow paths 516 into the interior of the liquid flow tube 514 via respective side ports 532. The liquid side flow paths 516 merge into a common liquid flow path in the interior, and the liquid exits the liquid flow tube 514 as a liquid outlet flow path 534 or stream via the open second end 526. As one non-exclusive example, the liquid side flow paths 516 are permeate flow paths (such as from the interior(s) of membrane envelope(s) as described below) that merge into a common permeate flow path in the interior of the liquid flow tube 514, and the combined permeate flow stream exits the liquid flow tube 514 along the liquid outlet flow path 534.

Figure 6:
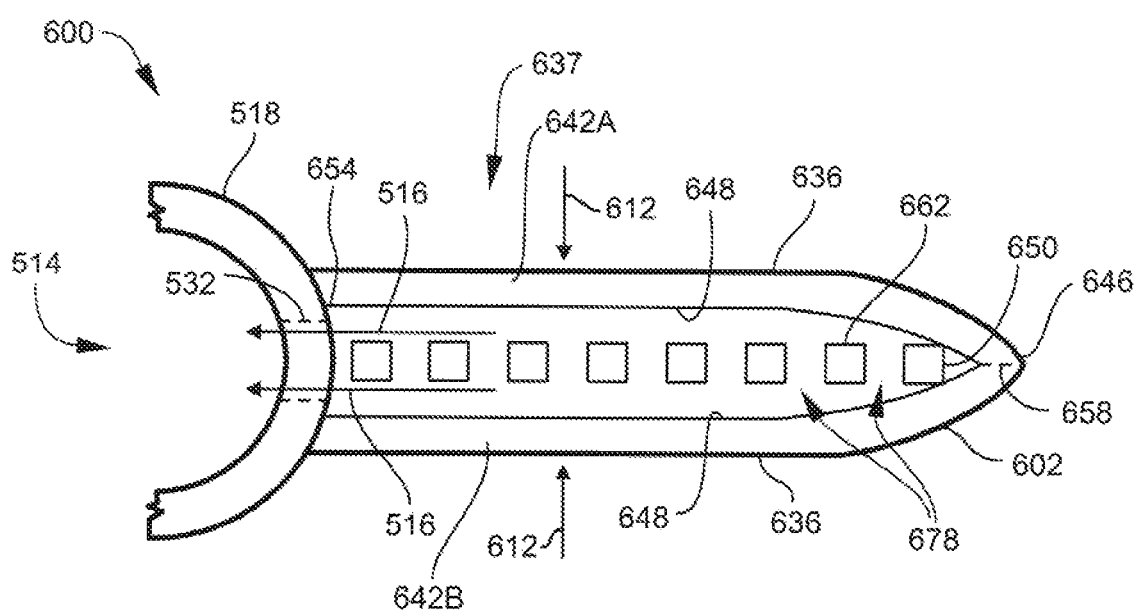
FIG. 6 is a schematic cross-sectional view of an example of (a portion of) a membrane assembly according to an embodiment, particularly a membrane assembly having a spiral wound configuration.

FIG. 6 is a schematic cross-sectional view of an example of (a portion of) a membrane assembly 600 according to an embodiment, particularly a membrane assembly having a spiral wound configuration. The membrane assembly 600 includes the liquid flow tube 514 (partially represented in FIG. 6) described above and illustrated in FIG. 5. The membrane assembly 600 further includes one or more membrane envelopes (or leaves) 637 attached to the side of the liquid flow tube 514.

The membrane envelope (or leaf) 637 includes a membrane body 602 enclosing a porous, planar, electrically conductive member, which in the present embodiment serves as a conductive permeate spacer 662. As illustrated, the membrane body 602 is configured to include two membrane body sections 642A and 642B (or a first membrane body (section) 642A and a second membrane body (section) 642B) positioned adjacent to the respective planar sides of the permeate spacer 662. Further, the membrane body 602 includes a closed outer end 646 at which the membrane body sections 642A and 642B are adjoined and adjacent to an outer edge 650 of the permeate spacer 662, and an open inner end 654 at which the membrane body sections 642A and 642B are spaced from each other and attached to the liquid flow tube 514. The membrane body sections 642A and 642B are attached at locations on the liquid flow tube 514 such that the open inner end 654 communicates with one row of side ports 532 of the liquid flow tube 514. In an embodiment, the membrane body sections 642A and 642B may also be attached to each other along the lateral edges (not shown) of the membrane body 602 that are parallel to the plane of the drawing sheet of FIG. 6. The membrane body sections 642A and 642B may be attached to the liquid flow tube 514 and to each other by any suitable bonding agent (e.g., adhesive, etc.), which may also be effective as a liquid seal at the region of attachment.

In one embodiment, the membrane body sections 642A and 642B may be formed by folding a single membrane body 602 around the outer edge 650 of the permeate spacer 662 at an outer edge region 658 of the membrane body 602 located at the closed outer end 646. In such embodiment, the outer edge region 658 corresponds to a fold line of the membrane body 602. In another embodiment, the membrane body sections 642A and 642B initially may be separate sections (or separate membrane bodies 602) that are later attached to each other at the outer edge region 658 by any suitable means (e.g., a bonding agent as described above). In such embodiment, the outer edge region 658 corresponds to a line or region of attachment of the membrane body 602.

The membrane body 602 may be configured as described above in conjunction with FIG. 2. Thus, the membrane body 602 may include a semipermeable layer 208 (FIG. 2) having a front (or input, or semipermeable) surface 636, and a porous support structure 204 (FIG. 2) disposed on the semipermeable layer 208 and having a back (or output, or permeate) surface 648 opposing the front surface 636 of the semipermeable layer 208. In one embodiment, the membrane body 602 is arranged relative to the permeate spacer 662 such that the front surface 636 of the semipermeable layer 208 faces away from the permeate spacer 662 and the back surface 648 of the porous support structure 204 faces toward the permeate spacer 662. Thus in this embodiment, a feed liquid to be filtered flows outside of the membrane envelope 637 and parallel to the front surface 636 of the semipermeable layer 208 of the membrane body 602. For example, the feed liquid may flow in a direction generally perpendicular to the plane of the drawing sheet of FIG. 6. The permeate portion of the feed liquid is able to pass through the semipermeable layer 208 and into the interior of the membrane envelope 637, as depicted by arrows 612. The permeate may flow around and through pores 678 of the permeate spacer 662 between the membrane body sections 642A and 642B. The permeate then passes from the membrane envelope 637 into the liquid flow tube 514 via the open inner end 654 of the membrane body 602 and the side port(s) 532 of the liquid flow tube 514, as depicted by arrows 516. As described above and illustrated in FIG. 5, the permeate then exits the liquid flow tube 514 as a permeate outlet flow path 534 via the open second end 526 of the liquid flow tube 514.

Figure 7A:
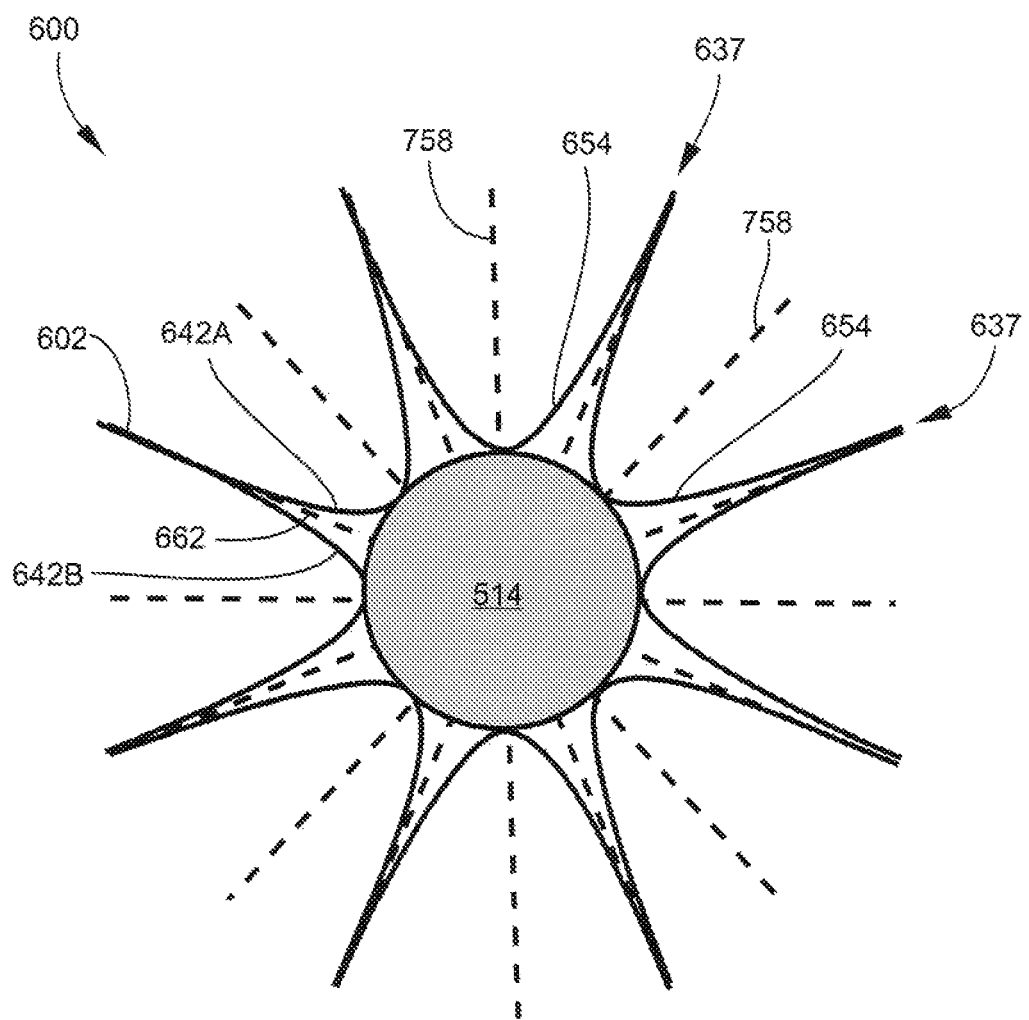
FIG. 7A is a schematic end view of the membrane assembly illustrated in FIG. 6 in a partially assembled state.

FIG. 7A is a schematic end view of the membrane assembly 600 in a partially assembled state. A plurality of membrane envelopes 637 are attached to the side of the liquid flow tube 514 around the circumference thereof, such that the open inner ends 654 of the membrane envelopes 637 are aligned in communication with respective rows of side ports 532 (FIGS. 5 and 6) of the liquid flow tube 514. A plurality of porous, planar, electrically conductive members, which in the present embodiment serve as feed spacers 758, are also attached to the side of the liquid flow tube 514 around the circumference thereof. Accordingly, each conductive feed spacer 758 is positioned between two adjacent membrane envelopes 637. Hence, with the membrane envelopes 637 configured as described above in conjunction with FIG. 6, the planar sides of each conductive feed spacer 758 face the semipermeable layers of the corresponding pair of adjacent membrane envelopes 637.

In use, the conductive feed spacers 758 provide volumetric spaces for feed liquid to flow between the adjacent membrane envelopes 637 and into contact with the semipermeable layers. Consequently, the permeate portion of the feed liquid is forced through the semipermeable layers and into the interiors of the membrane envelopes 637 as illustrated in FIG. 6, whereby the permeate portion is separated from the retentate portion of the feed liquid.

Before or after attaching the membrane envelopes 637 and the feed spacers 758 to the liquid flow tube 514, power distribution electrodes and electrical leads, such as described above and illustrated in FIGS. 3A and 3B, may be attached to or formed on the permeate spacers 662 and the feed spacers 758. In an embodiment where the semipermeable layers of the membrane bodies 602 are electrically conductive, power distribution electrodes and electrical leads may also be attached to or formed on the semipermeable layers.

Figure 7B:
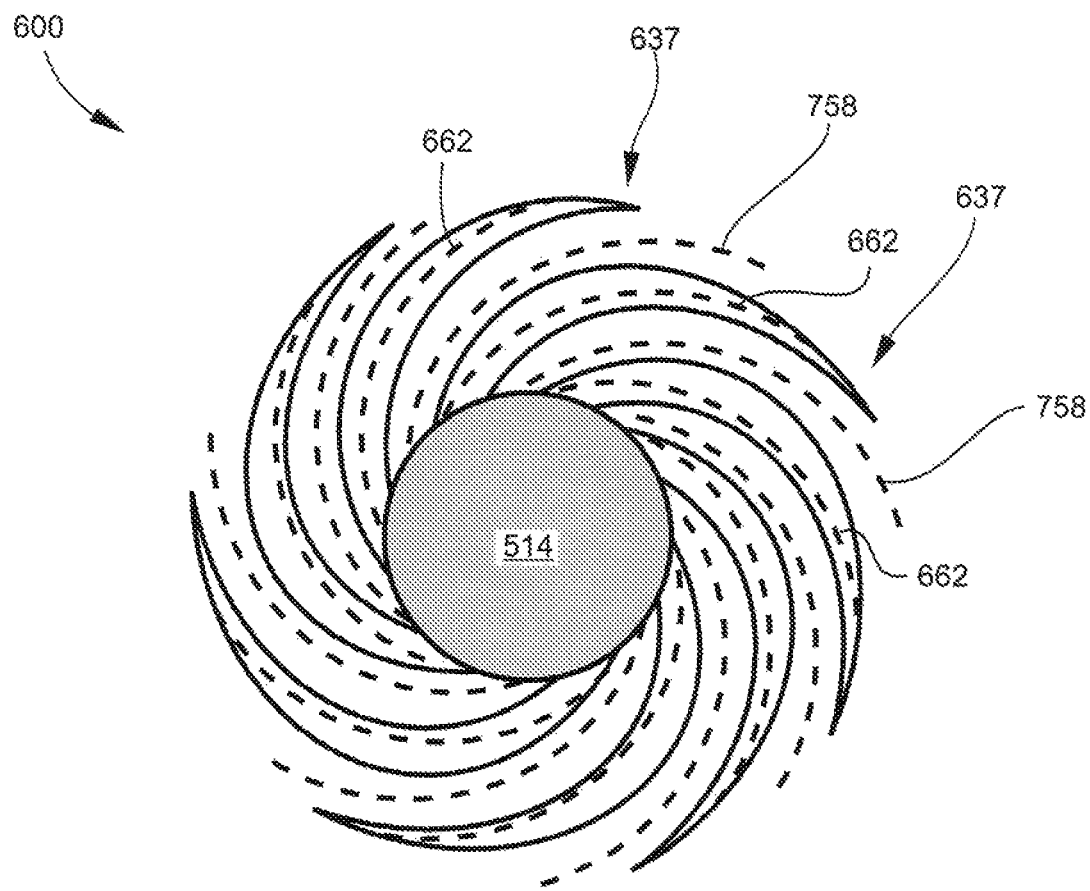
FIG. 7B is a schematic end view of the membrane assembly illustrated in FIG. 6 in a further partially assembled state in comparison to FIG. 7A.

FIG. 7B is a schematic end view of the membrane assembly 600 in a further partially assembled state in comparison to FIG. 7A. After the membrane envelopes 637 (corresponding membrane bodies 602 and conductive permeate spacers 662) and the conductive feed spacers 758 have been attached to the liquid flow tube 514, they are wrapped or wound around the longitudinal axis of the liquid flow tube 514 in a spiral manner.

Figure 7C:
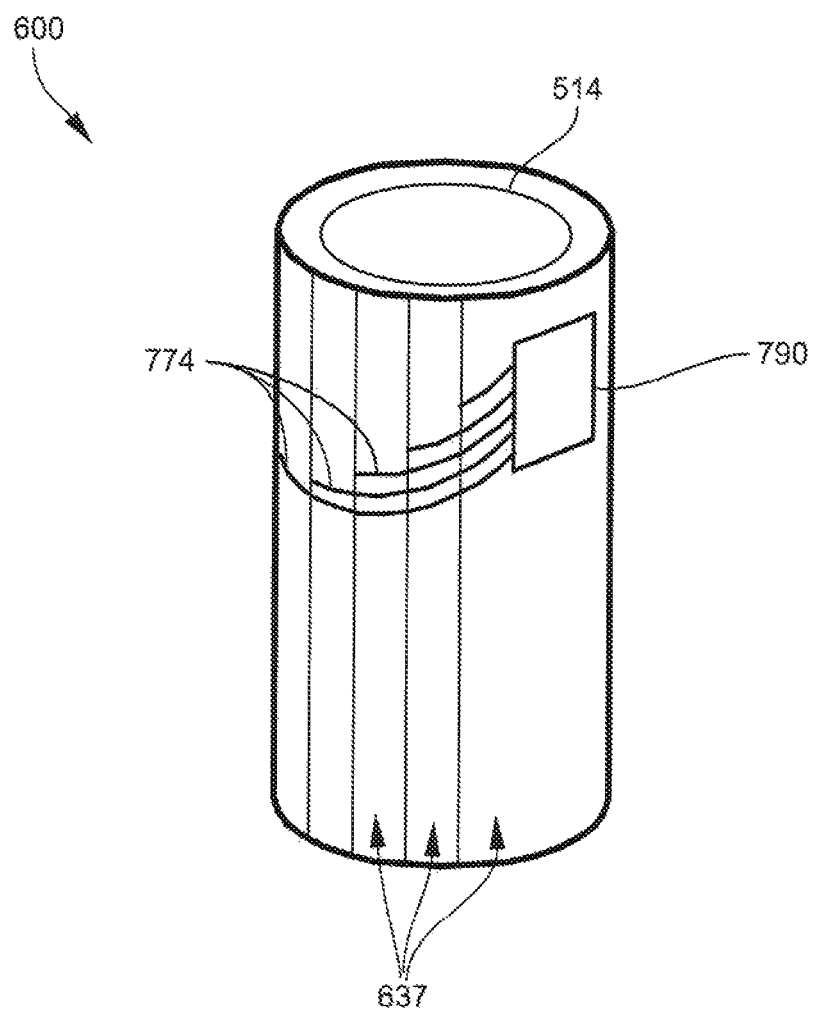
FIG. 7C is a schematic perspective view of the membrane assembly illustrated in FIG. 6 in a further partially assembled state in comparison to FIGS. 7A and 7B.

FIG. 7C is a schematic perspective view of the membrane assembly 600 in a further partially assembled state in comparison to FIGS. 7A and 7B. A power receiving unit 790 is positioned on or proximate to (depending on the embodiment) the membrane envelopes 637, such as the outermost membrane envelope 637 wound about the liquid flow tube 514. The power receiving unit 790 may be configured according to any of the embodiments described herein. Electrical lines or leads 774 communicating with (e.g., coupled to) the power distribution electrodes of the conductive permeate spacers 662 and the conductive feed spacers 758 (and also, optionally, conductive semipermeable layers, if provided) are also placed in communication with (e.g., coupled to) the power receiving unit 790.

Figure 7E:
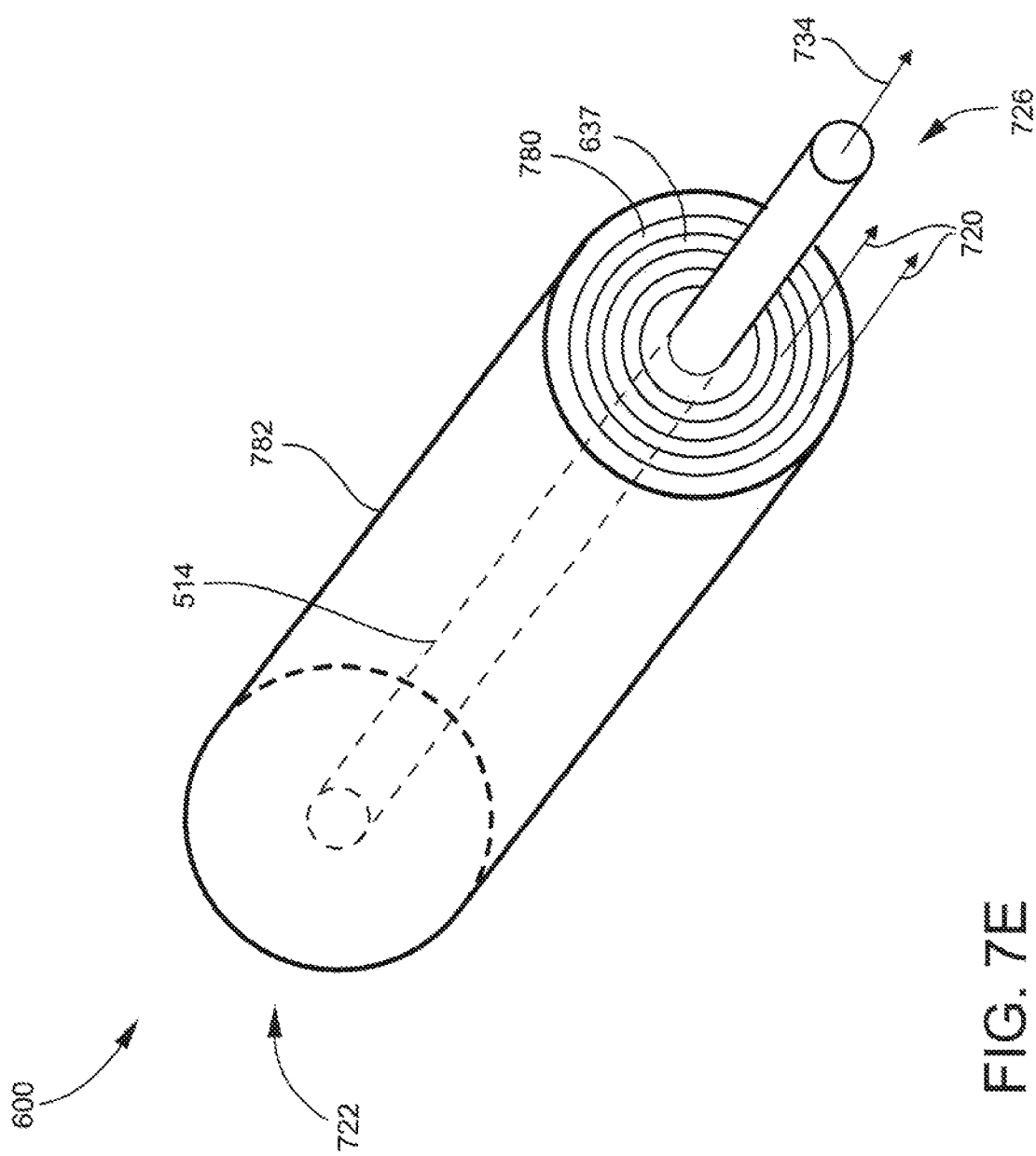
FIG. 7E is a schematic perspective, partially cut-away view of the membrane assembly illustrated in FIG. 6 in an assembled state, from the perspective of a second end of the membrane assembly.

FIG. 7D is a schematic perspective, partially cut-away view of the membrane assembly 600 in an assembled state, from the perspective of a first end 722 of the membrane assembly 600. FIG. 7E is a schematic perspective, partially cut-away view of the membrane assembly 600 in an assembled state, from the perspective of a second end 726 of the membrane assembly 600. After fully winding the membrane envelopes 637 and the conductive feed spacers 758 (FIGS. 7A and 7B) around the liquid flow tube 514, the resulting cylindrical, spiral-wound arrangement may be inserted into a cylindrical outer structure 782 (or, depending on the embodiment, the cylindrical outer structure 782 may be formed as a layer of material around the spiral-wound arrangement). The cylindrical outer structure 782 may correspond to the outer structure 482 described above in conjunction with FIG. 4. The resulting membrane assembly 600 is cylindrical and elongated between the first end 722 at or near the first end 522 (FIG. 5) of the liquid flow tube 514, and the second end 726 at or near the second end 526 (FIG. 5) of the liquid flow tube 514. Due to the presence of the conductive feed spacers 758, spiral feed channels 780 are interleaved between the spiral-wound membrane envelopes 637.

In operation, feed liquid may be flowed (e.g., driven under pressure) into the feed channels 780 at the first end 722 between the membrane envelopes 637, as depicted by arrows 712 in FIG. 7D. The permeate fraction of the feed liquid migrates through the semipermeable layers of the membrane envelopes 637 and through spiral permeate channels defined by the presence of the conductive permeate spacers 662 inside the membrane envelopes 637. Ultimately, the permeate enters the liquid flow tube 514 via its side ports 532, as described above and depicted by the resultant, radial inward directions of arrows 516 in FIGS. 5 and 6. The permeate collected in the liquid flow tube 514 exits the membrane assembly 600 via the open second end 526 (FIG. 5) of the liquid flow tube 514, as depicted by an arrow 734 in FIG. 7E. The retentate fraction of the feed liquid continues to flow through the feed channels 780 along the length of the membrane assembly 600, and exits the membrane assembly 600 from the feed channels 780 at the second end 726, as depicted by arrows 720 in FIG. 7E.

Figure 8:
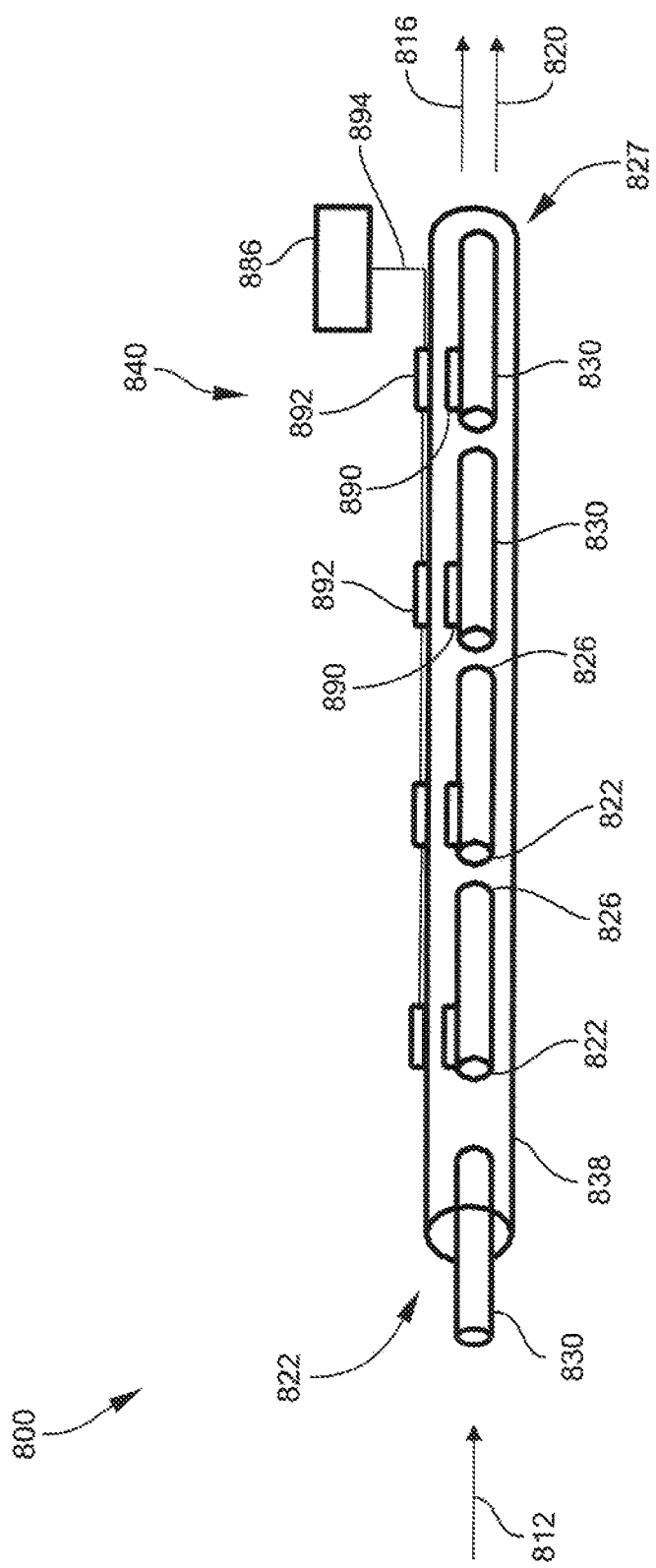
FIG. 8 is a schematic view of an example of a membrane-based liquid filtration system according to an embodiment.

FIG. 8 is a schematic view of an example of a membrane-based liquid filtration system 800 according to an embodiment. The liquid filtration system 800 includes one or more membrane assemblies 830 positioned in a container 838, and a power supply system 840.

The container 838 may be configured as a pressure vessel capable of containing liquid at a fluid operating pressure appropriate for the filtering application being implemented (e.g., MF, UF, NF, RO). The container 838 may be composed of any material suitable for this purpose, one non-exclusive example being a fiberglass-reinforced plastic. The container 838 may be elongated along a longitudinal axis between a container first end 822 and a container second end 827. For example, the container 838 may be cylindrical as illustrated. The container first end 822 and/or the container second end 827 may be open or include liquid inlet(s) and/or liquid outlet(s). In such configuration, the container first end 822 may be configured to receive a flow of feed liquid 812, and the container second end 827 may be configured to output flows of permeate 816 and retentate 820, as illustrated. In assembling the system 800, the membrane assemblies 830 may be installed in the interior of the container 838 by loading the membrane assemblies 830 through the container first end 822 (as illustrated) and/or the container second end 827.

The membrane assemblies 830 may be configured according to any of the embodiments described herein. Accordingly, the membrane assemblies 830 may include membrane bodies and electrically conductive members, with at least some of the electrically conductive members configured as porous feed spacers or permeate spacers, as described above and illustrated in FIGS. 2-7E. The membrane assemblies 830 may be spiral-wound membrane assemblies that include membrane envelopes separated by feed channels and wrapped around liquid flow tubes, as described above and illustrated in FIGS. 5-7E. Each membrane assembly 830 includes a first (input) end 822 and a second (output) end 826. In the illustrated embodiment, the membrane assemblies 830 are arranged in series, i.e., end-to-end, inside the container 838 between the container first end 822 and the container second end 827. The membrane assemblies 830 are spaced from each other along the longitudinal axis of the container 838. By this arrangement, the first end 822 of the first (leftmost, in the view of FIG. 8) membrane assembly 830 is axially spaced from the container first end 822, the first end 822 of each of the other membrane assemblies 830 is axially spaced from the second end 826 of the axially preceding membrane assembly 830, and the second end 826 of the last (rightmost, in the view of FIG. 8) membrane assembly 830 is axially spaced from the container second end 827.

Axially adjacent membrane assemblies 830 may fluidly communicate with each other (via corresponding first ends 822 and second ends 826)—and the first membrane assembly 830 may fluidly communicate with the container first end 822 and the last membrane assembly 830 may fluidly communicate with the container second end 827—by any appropriate means, such as open communication inside the container 838 or liquid lines (not shown) provided inside the container 838, depending on the embodiment.

In an embodiment, the membrane assemblies 830 are axially (serially) arranged and fluidly communicate with each other such that they operate as successive liquid filtration stages. In such embodiment, the feed liquid 812 from the container first end 822 flows (is directed) into the first membrane assembly 830 via the first end 822 of the first membrane assembly 830. The first membrane assembly 830 produces separate flows of permeate and retentate in the manner described above. The permeate exiting the second end 826 of the first membrane assembly 830 flows (is directed) as a feed liquid into the second membrane assembly 830 via the first end 822 of the second membrane assembly 830. Consequently, the permeate from the first membrane assembly 830 is subjected to additional filtration in the second membrane assembly 830. This process is repeated in additional (successive) stages, depending on the total number of membrane assemblies 830 provided in the system 800. Finally, the permeate exiting the second end 826 of the last membrane assembly 830 exits the system 800 via the container second end 827, as depicted in FIG. 8 by the output flow of permeate 816.

Also in this embodiment, the flow of retentate exiting each membrane assembly 830 may be directed into a common retentate line (e.g., a manifold, not shown) in the container 838. The combined or merged flow of retentate may then exit the system 800 via the container second end 827, as depicted in FIG. 8 by the output flow of retentate 820.

As appreciated by persons skilled in the art, the liquid flow through the system 800, including along the various flow paths established through the interior of the container 838 and through the membrane assemblies 830, may be driven by one or more liquid pumps (not shown) of any appropriate type. The liquid pump(s) may be positioned upstream of and/or downstream from the container 838 as needed to establish and maintain a fluid operating pressure of the system 800 effective to drive the liquid through the layers of the membrane assemblies 830.

As also illustrated in FIG. 8, the power supply system 840 includes a suitable electrical power source 886 communicating with a plurality of wireless power transmitting units 892 via one or more electrical lines 894. In an embodiment, one power transmitting unit 892 is provided for each membrane assembly 830 to which electrical power is to be supplied in the manner described herein. Each such membrane assembly 830 includes a power receiving unit 890 as described herein in conjunction with FIG. 7C. In an embodiment, each power transmitting unit 892 is mounted to an outer surface of the container 838 at a radial (relative to the longitudinal axis of the container 838) distance from the power receiving unit 890 of a corresponding membrane assembly 830. By this configuration, electrical power is wirelessly transmitted from the power transmitting units 892, through the wall of the container 838, and to the corresponding power receiving units 890. The electrical power is then utilized to apply voltages to the membrane assemblies 830 in the manner described herein.

In the embodiment specifically illustrated in FIG. 8, each membrane assembly 830 provided in the system 800 is electrically conductive. That is, each membrane assembly 830 is configured to be electrically charged, i.e. includes electrically conductive members configured to receive power from the power supply system 840 and apply a voltage to components of the membrane assembly 830. Alternatively, less than all membrane assemblies 830 provided in the system 800 may include electrically conductive members. In other words, one or more of the membrane assemblies 830 may have conventional configurations that are not electrically conductive. For example, in a given system 800 providing a plurality of membrane assemblies 830, it may be found that the electrical charge-based antifouling functionality disclosed herein is needed only for (or is most effective when implemented in) the first membrane assembly 830 at the entrance of the container 838, or the first few membrane assemblies 830, while the other membrane assemblies 830 may be non-conductive. Thus, in an embodiment, the system 800 may include one or more electrically conductive membrane assemblies 830 and one or more non-conductive membrane assemblies.

Figure 9A:
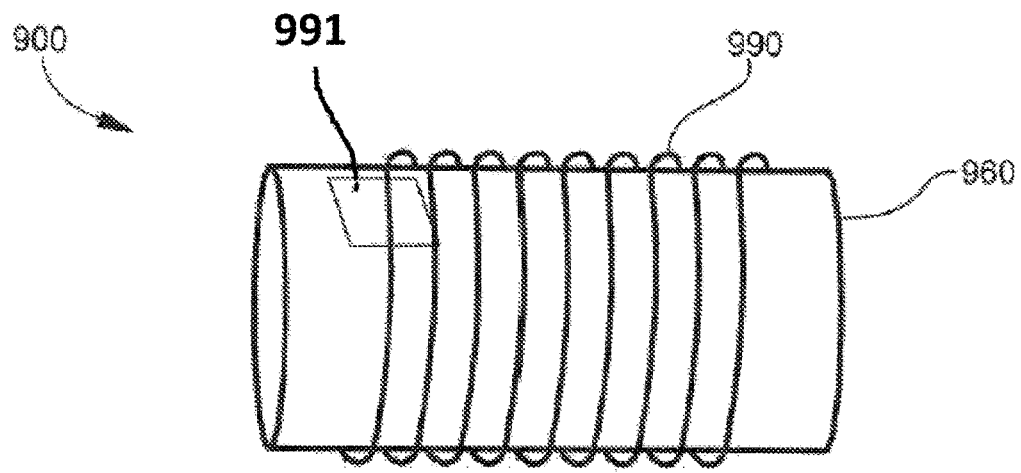
FIG. 9A is a schematic perspective view of an example of a membrane assembly according to another embodiment.

FIG. 9A is a schematic perspective view of an example of a membrane assembly 900 according to another embodiment. The membrane assembly 900 may be configured as a spiral-wound membrane assembly as described above and illustrated in FIGS. 5-7E. Thus, the membrane assembly 900 includes as a spiral-wound core 960 formed by membrane envelopes containing permeate spacers, with the membrane envelopes separated by feed channels containing or defined by feed spacers. In addition, the membrane envelopes and feed channels are wrapped around a liquid flow tube, and include electrically conductive components such as the feed spacers and/or the permeate spacers and optionally also the semipermeable membranes.

In the present embodiment, the membrane assembly 900 includes a wireless power receiving unit that is configured as a receiving coil (or inner coil) 990. The receiving coil 990 surrounds the spiral-wound layers of the membrane assembly 900. The receiving coil 990 is positioned in either direct contact with or close proximity to the outermost spiral-wound layer and exposed portions of the other spiral-wound layers (see, e.g., FIG. 7C) of the membrane assembly 900. The receiving coil 990 is configured to receive electrical power from an external power source as described herein, and couple the electrical power into the electrically conductive components of the membrane assembly 900 by electromagnetic induction. The receiving coil 990 may have any physical configuration suitable for this purpose. In the non-exclusive example illustrated in FIG. 9A, the receiving coil 990 is an elongated electrical conductor helically wound about the longitudinal axis of the membrane assembly 900. The power receiving unit may also include circuitry 991 configured to perform other functions as described above in conjunction with FIG. 4.

Figure 9B:
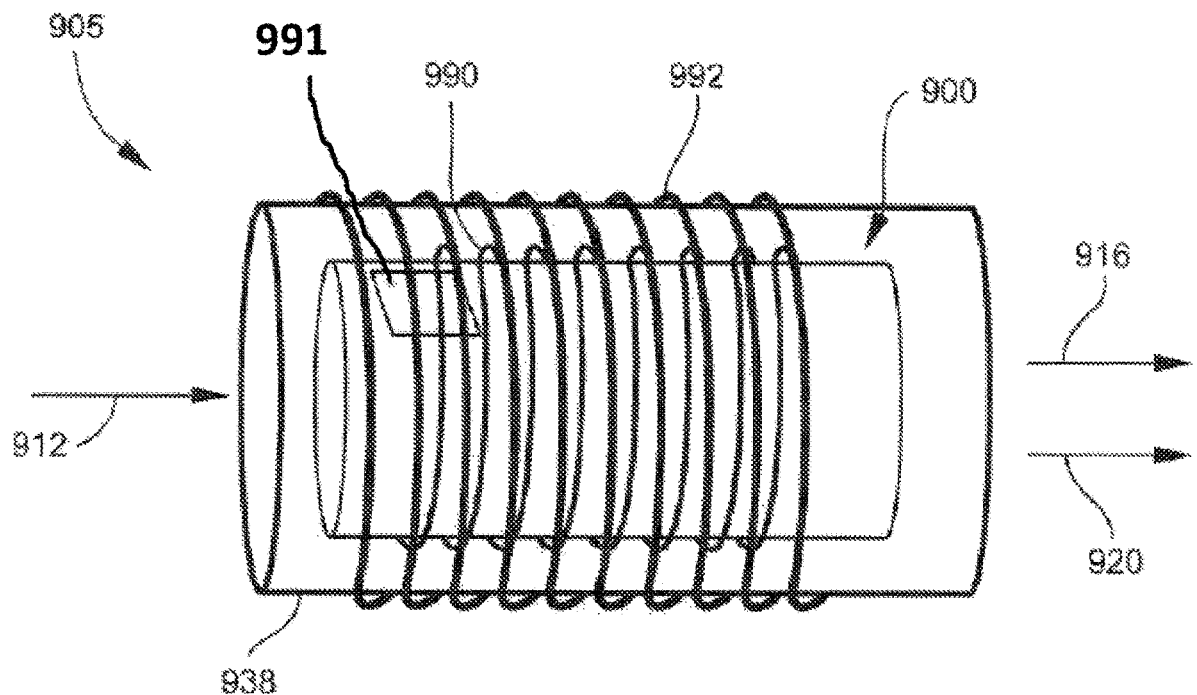
FIG. 9B is a schematic perspective view of an example of a membrane-based liquid filtration system (or portion thereof) according to another embodiment.

FIG. 9B is a schematic perspective view of an example of a membrane-based liquid filtration system 905 (or portion thereof) according to another embodiment. The system 905 includes the membrane assembly 900 described above and illustrated in FIG. 9A, and a container 938 in which the membrane assembly 900 is positioned. The container 938 may be configured and function in the same or similar manner as the container 838 described above and illustrated in FIG. 8. Thus, the container 938 receives a flow of feed liquid 912 and outputs flows of permeate 916 and retentate 920 in accordance with the separation or filtration process implemented by the membrane assembly 900.

In the present embodiment, the system 905 includes a wireless power transmitting unit that is configured as a transmitting coil (or outer coil) 992. The transmitting coil 992 is mounted or attached to the outer surface of the container 938 so as to surround the membrane assembly 900, including the receiving coil 990 of the membrane assembly 900. The transmitting coil 992 is configured to receive electrical power from an external power source as described herein, and wirelessly transmit the power to the receiving coil 990, which in turn couples the electrical power into the electrically conductive components of the membrane assembly 900 by electromagnetic induction as noted above. The transmitting coil 992 may have any physical configuration suitable for this purpose. In the non-exclusive example illustrated in FIG. 9B, the transmitting coil 992 is an elongated electrical conductor helically wound about the longitudinal axis of the container 938.

The use of induction coils in the wireless transmitting and receiving units of embodiments disclosed herein is advantageous because it enables the transfer of power into a vessel without needing to bore holes for wiring. The use of induction coils also may be desirable or advantageous for ensuring uniform and efficient distribution of electrical power to the electrically conductive components of membrane assemblies. Induction coils may be particularly effective when utilized in conjunction with membrane assemblies of complex geometry or configuration, such as the multi-layer, spiral-wound membrane assembly 900 illustrated in FIGS. 9A and 9B.

Figure 10:
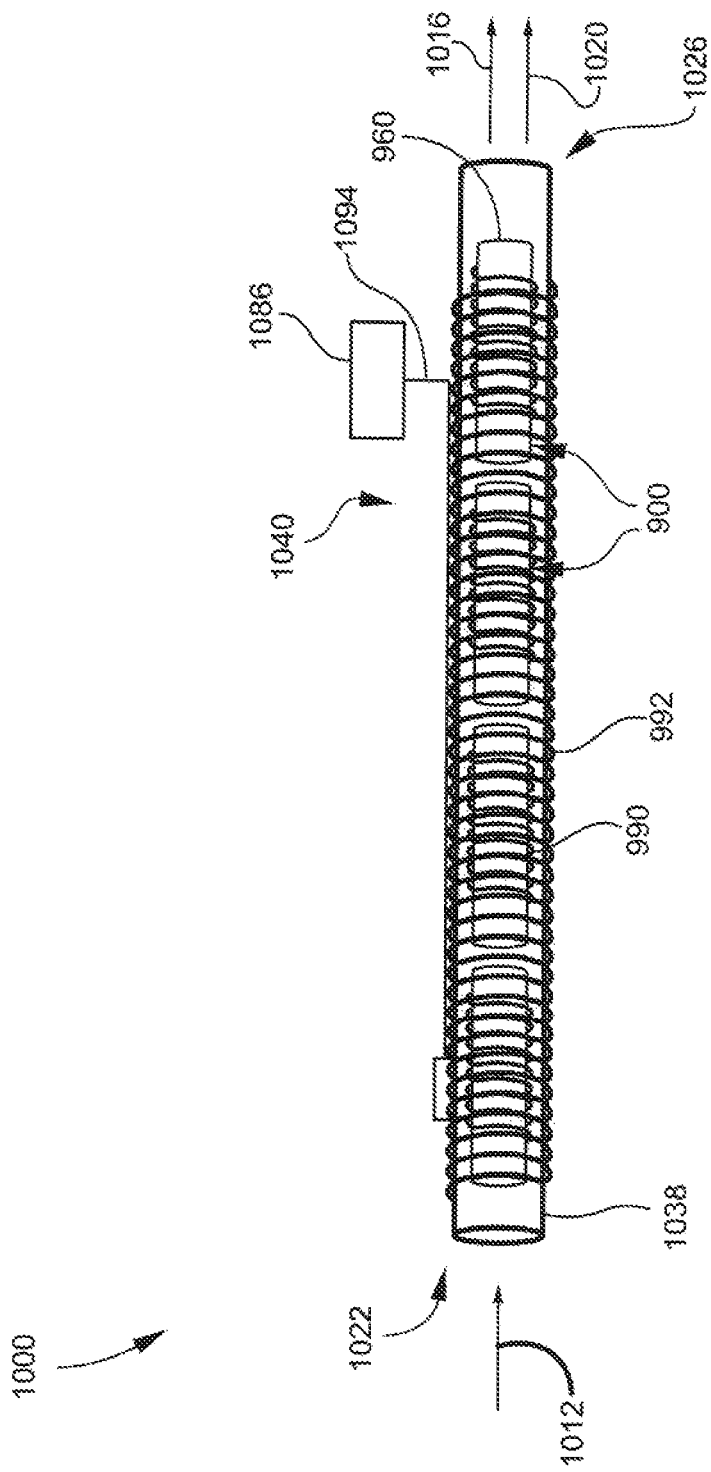
FIG. 10 is a schematic perspective view of an example of a membrane-based liquid filtration system according to another embodiment.

FIG. 10 is a schematic perspective view of an example of a membrane-based liquid filtration system 1000 according to another embodiment. The system 1000 includes a plurality of the above-described membrane assemblies 900 positioned in axial (end-to-end) series in a container 1038, and a power supply system 1040.

The container 1038 may be configured in the same or similar manner as the container 838 described above and illustrated in FIG. 8. Thus, the container 1038 may be a cylindrical pressure vessel elongated along a longitudinal axis between a container first end 1022 and a container second end 1026. The container first end 1022 and/or the container second end 1026 may be open or include liquid inlet(s) and/or liquid outlet(s), such that the container first end 1022 receives a flow of feed liquid 1012 and the container second end 1026 outputs flows of permeate 1016 and retentate 1020, as illustrated.

The membrane assemblies 900 may be configured as described above and illustrated in FIG. 9A. Thus, each membrane assembly 900 includes a receiving coil (or inner coil) 990. The membrane assemblies 900 may be positioned, axially spaced from each other, and fluidly intercoupled in the same or similar manner as described above and illustrated in FIG. 8.

The power supply system 1040 includes the transmitting coil (or outer coil) 992 described above and illustrated in FIG. 9B, which is wound around the container 1038. In the present embodiment, the transmitting coil 1092 has a length sufficient for the transmitting coil 992 to surround all of the membrane assemblies 900 provided in the container 1038

(or at least all of the membrane assemblies 900 requiring power in the manner described herein). The power supply system 1040 further includes a suitable electrical power source 1086 communicating with the transmitting coil 992 via one or more electrical lines 1094. The transmitting coil 992 and the receiving coils 990 operate to transfer electrical power to the membrane assemblies 900 in the manner described above in conjunction with FIGS. 9A and 9B.

In the embodiment specifically illustrated in FIG. 10, each membrane assembly 900 provided in the system 1000 is electrically conductive and thus includes a receiving coil 990. Alternatively, less than all membrane assemblies 900 provided in the system 1000 may include electrically conductive members. Thus, in an embodiment, the system 1000 may include one or more electrically conductive membrane assemblies 900, and one or more non-conductive membrane assemblies that do not include receiving coils 990.

Experimental Example

This example summarizes an experiment performed to evaluate the effectiveness of the use of electrically conductive spacers in membrane-based filter devices as disclosed herein.

The testing apparatus included a STERLITECH acrylic SEPA crossflow cell (Sterlitech Corporation, Kent, Washington, USA) in which DOW FILMTEC™ NF270 nanofiltration membranes (Dow Chemical Company, Midland, Michigan, USA) were installed. The active surface area of the membranes was 160 cm$^2$. The membranes were encased by electrically conductive permeate and feed spacers. The spacers were rendered conductive by spray coating them with dispersions of PEDOT:PSS. The spacers were continuously sprayed and dried in a binder oven set at 70° C. until electrical resistivities were at or less than about 200 kΩ/cm. A RIGOL DG1022 Waveform Generator (RIGOL Technologies, Inc., Beaverton, Oregon, USA) was used to produce an electrical potential (2V) across the conductive spacers. Titanium electrodes provided the electrical interconnections between the waveform generator and the conductive spacers.

A 20 liter (L) solution containing sodium sulfate (Na$_2$SO$_4$) 1.91 g/L, magnesium sulfate (MgSO$_4$) 1.45 g/L, and calcium chloride (CaCl$_2$) 1.82 g/L was prepared to mimic brackish groundwater. Pressure was maintained at 80 psi using a needle valve. Permeate was poured back into the feed tank at various intervals in order to maintain a desired total dissolved solids (TDS) range. Permeate mass was recorded over time in order to calculate flux. The cell was run both with and without an applied voltage (2V) and flux versus time results were produced.

Figure 11:
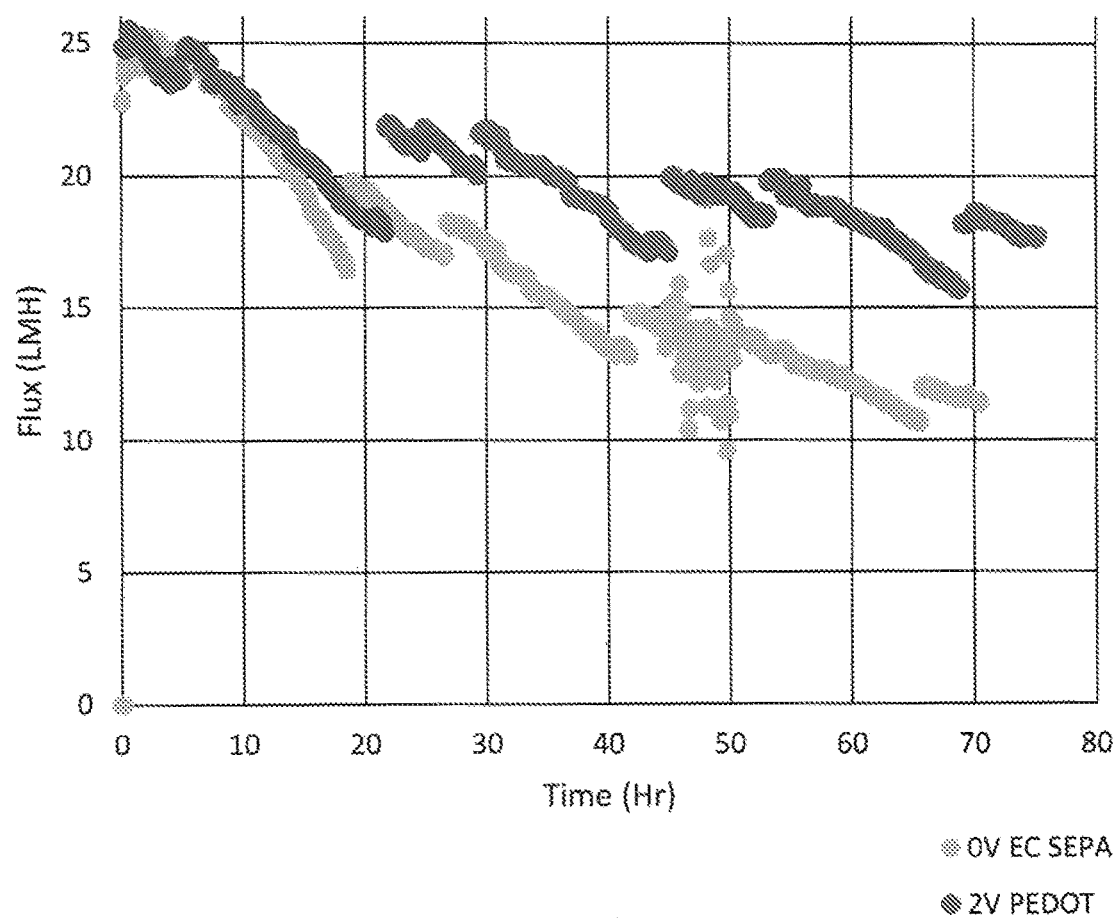
FIG. 11 is a plot of flux (in LMH) versus time (in hours) comparing the results of experimental runs conducted on a test filtration apparatus with a voltage applied to membranes and without a voltage applied to the membranes.

FIG. 11 illustrates the results of this experiment. Specifically, FIG. 11 is a plot of flux in liters/m$^2$/hr (LMH) versus time (in hours) for the experimental runs with and without the applied voltage. FIG. 11 demonstrates a clear improvement in flux recovery when the voltage is applied to the PEDOT-coated spacers during the filtration process, in comparison to no voltage being applied. Specifically, FIG. 11 shows a 20% decline in flux with the voltage applied, as opposed to a 40% decline in flux without the voltage applied, after 45-50 hours of operation.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A membrane assembly for separating a feed liquid into a permeate and a retentate, the membrane assembly comprising:
   a first side for receiving the feed liquid;
   a second side for outputting the permeate;
   a membrane body comprising a semipermeable front surface at the first side, a back surface at the second side, and a thickness defined from the semipermeable front surface to the back surface,
   wherein the membrane body is configured to pass the permeate through the semipermeable front surface to the back surface, and prevent the retentate from passing through the semipermeable front surface;
   a porous first electrically conductive member positioned at the first side and configured to pass the feed liquid through the porous first electrically conductive member to the semipermeable front surface;
   a porous second electrically conductive member positioned at the second side and configured to pass the permeate from the back surface through the porous second electrically conductive member,
   wherein the porous first electrically conductive member and the porous second electrically conductive member are configured to maintain the semipermeable front surface in an electrically charged state when a voltage is applied between the porous first electrically conductive member and the porous second electrically conductive member; and
   a wireless power receiving unit configured to wirelessly receive electrical power from a wireless power transmitting unit external to the membrane assembly in electrical communication, wherein the wireless power receiving unit is in electrical communication with at least one of the porous first electrically conductive member or the porous second electrically conductive member for transmitting the received electrical power to the at least one of the porous first electrically conductive member or the porous second electrically conductive member.

2. The membrane assembly of claim 1, wherein the semipermeable front surface has a surface area in a range from 0.1 m$^2$ to 100 m$^2$.

3. The membrane assembly of claim 1, wherein the semipermeable front surface has a composition selected from the group consisting of: polyamide; polysulfone; polyvinyldienlefluoride; and polyacrylonitrile.

4. The membrane assembly of claim 1, wherein the membrane body comprises an electrically conductive component effective for rendering the semipermeable front surface electrically conductive.

5. The membrane assembly of claim 4, wherein the electrically conductive component has a composition selected from the group consisting of: carbon nanotubes bonded to the semipermeable front surface; a conductive polymer; an intrinsically conductive polymer; poly(3,4-ethylenedioxythiophene) polystyrene sulfonate (PEDOT:

PSS); polyacetylene; polypyrrole (PPY); polyindole; polyaniline (PANI); and polymers doped or grafted with a metal.

6. The membrane assembly of claim 1, wherein the porous first electrically conductive member and the porous second electrically conductive member have a composition selected from the group consisting of: a metal; a metal alloy; carbon, a conductive polymer; an intrinsically conductive polymer; poly(3,4-ethylenedioxythiophene) polystyrene sulfonate (PEDOT:PSS); polyacetylene, polypyrrole (PPY); polyindole; polyaniline (PANI); and polymers doped or grafted with a metal.

7. The membrane assembly of claim 1, wherein the porous first electrically conductive member and the porous second electrically conductive member comprise respective grids.

8. The membrane assembly of claim 1, comprising a power distribution electrode disposed on at least one of the porous first electrically conductive member or the porous second electrically conductive member.

9. The membrane assembly of claim 8, wherein the power distribution electrode has a configuration selected from the group consisting of:
the power distribution electrode comprises a conductive strip disposed at an edge of the porous first electrically conductive member or the porous second electrically conductive member;
the power distribution electrode comprises a two-dimensional pattern of electrically conductive material; and
the power distribution electrode comprises a two-dimensional pattern of electrically conductive material, and the two-dimensional pattern comprises one or more strips forming a closed loop.

10. The membrane assembly of claim 1, wherein the wireless power receiving unit has a configuration selected from the group consisting of:
the power receiving unit comprises a two-dimensional pattern of electrically conductive material disposed on a substrate, and the substrate is disposed on the membrane assembly; and
the wireless power receiving unit comprises an electrically conductive coil surrounding the membrane assembly.

11. The membrane assembly of claim 1, comprising a tube, wherein the membrane body, the porous first electrically conductive member, and the porous second electrically conductive member are wound about the tube.

12. The membrane assembly of claim 11, wherein:
the tube comprises a hollow body defining a tube interior, and a side port in the hollow body;
the membrane body is configured as a membrane envelope comprising a closed outer end, an open inner end, and an envelope interior between the closed outer end and the open inner end and bounded by the back surface;
the membrane body is attached to the hollow body such that the envelope interior communicates with the side port, and the membrane assembly defines a liquid side flow path from the envelope interior into the tube interior via the side port; and
the porous second electrically conductive member is positioned in the envelope interior.

13. The membrane assembly of claim 11, wherein:
the membrane body is one of a plurality of membrane bodies wound about the tube, the porous first electrically conductive member is one of a plurality of porous first electrically conductive members wound about the tube, and the porous second electrically conductive member is one of a plurality of porous second electrically conductive members wound about the tube; and
the membrane assembly further comprises the wireless power receiving unit communicating with the porous first electrically conductive members, and configured to receive electrical power from the wireless transmitting unit external to the membrane assembly.

14. The membrane assembly of claim 13, wherein the wireless power receiving unit has a configuration selected from the group consisting of:
the wireless power receiving unit comprises a two-dimensional pattern of electrically conductive material disposed on a substrate, and the substrate is disposed on the membrane assembly; and
the wireless power receiving unit comprises an electrically conductive coil surrounding the membrane assembly.

15. A liquid filtration system, comprising:
the membrane assembly of claim 1; and
a wireless power supply system comprising:
the wireless power transmitting unit configured to receive power from an electrical power source; and
the wireless power receiving unit communicating with the wireless power transmitting unit and with at least one of the porous first electrically conductive member or the porous second electrically conductive member.

16. The liquid filtration system of claim 1, comprising a container, wherein the membrane assembly and the wireless power receiving unit are positioned in the container, and the wireless power transmitting unit is positioned outside the container.

17. The liquid filtration system of claim 16, wherein the power receiving unit comprises an inner coil surrounding the membrane assembly, and the power transmitting unit comprises an outer coil surrounding the container.

18. The liquid filtration system of claim 16, wherein the container is configured for microfiltration (MF), ultrafiltration (UF), reverse osmosis (RO) or nanofiltration (NF).

19. The liquid filtration system of claim 18, wherein the container is configured to operate under pressures of greater than 800 psi.

20. The membrane assembly of claim 1, wherein the assembly is positioned within a container.

21. The membrane assembly of claim 1, wherein the assembly and the container are configured to operate under pressures of greater than 800 psi.

22. The membrane assembly of claim 1, wherein the assembly comprises a plurality of membrane bodies.

* * * * *